(12) United States Patent
Hirose et al.

(10) Patent No.: US 8,932,744 B2
(45) Date of Patent: Jan. 13, 2015

(54) CURRENT COLLECTOR, ANODE, AND BATTERY

(75) Inventors: Takakazu Hirose, Fukushima (JP); Masayuki Iwama, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 1281 days.

(21) Appl. No.: 12/123,935

(22) Filed: May 20, 2008

(65) Prior Publication Data

US 2009/0061326 A1    Mar. 5, 2009

(30) Foreign Application Priority Data

May 23, 2007 (JP) ................. 2007-136815

(51) Int. Cl.

| | | |
|---|---|---|
| *H01M 4/02* | (2006.01) |
| *H01M 4/66* | (2006.01) |
| *H01M 2/02* | (2006.01) |
| *H01M 4/04* | (2006.01) |
| *H01M 4/34* | (2006.01) |
| *H01M 4/36* | (2006.01) |
| *H01M 4/38* | (2006.01) |
| *H01M 4/70* | (2006.01) |
| *H01M 10/052* | (2010.01) |
| *H01M 10/0568* | (2010.01) |
| *H01M 10/0569* | (2010.01) |

(52) U.S. Cl.
CPC ............ *H01M 4/661* (2013.01); *H01M 2/0257* (2013.01); *H01M 4/0421* (2013.01); *H01M 4/34* (2013.01); *H01M 4/366* (2013.01); *H01M 4/38* (2013.01); *H01M 4/70* (2013.01); *H01M 10/052* (2013.01); *H01M 10/0568* (2013.01); *H01M 10/0569* (2013.01); *Y02E 60/122* (2013.01); *Y02E 60/124* (2013.01)
USPC ............ 429/122; 429/517; 429/519; 429/522

(58) Field of Classification Search
None
See application file for complete search history.

(56) References Cited

U.S. PATENT DOCUMENTS

| | | | | |
|---|---|---|---|---|
| 6,183,908 | B1 * | 2/2001 | Miyasaka et al. | 429/218.1 |
| 2002/0015833 | A1 * | 2/2002 | Takahashi et al. | 428/209 |
| 2003/0003370 | A1 * | 1/2003 | Arai et al. | 429/326 |
| 2004/0072079 | A1 * | 4/2004 | Hashimoto et al. | 429/245 |
| 2004/0224231 | A1 * | 11/2004 | Fujimoto et al. | 429/232 |
| 2005/0153208 | A1 * | 7/2005 | Konishiike et al. | 429/245 |
| 2006/0099505 | A1 * | 5/2006 | Fujino et al. | 429/217 |
| 2006/0105239 | A1 | 5/2006 | Paulsen | |
| 2007/0020523 | A1 * | 1/2007 | Kawase et al. | 429/218.1 |
| 2007/0207386 | A1 * | 9/2007 | Konishiike et al. | 429/232 |

FOREIGN PATENT DOCUMENTS

| | | |
|---|---|---|
| JP | 2003-142106 | 5/2003 |
| JP | 2004-256879 | 9/2004 |
| JP | 2005-135856 | 5/2005 |

(Continued)

OTHER PUBLICATIONS

JP 2008010320 A Machine English Translation.*

*Primary Examiner* — Eugenia Wang
*Assistant Examiner* — Scott J Chmielecki
(74) *Attorney, Agent, or Firm* — Dentons US LLP

(57) ABSTRACT

A battery capable of improving the cycle characteristics is provided. A current collector containing copper (Cu), in which ratio I (200)/I (111) between intensity I (200) of a peak originated in (200) crystal plane of copper obtained by X-ray diffraction and intensity I (111) of a peak originated in (111) crystal plane thereof is in the range from 0.5 to 1.5.

45 Claims, 24 Drawing Sheets

(56) References Cited

FOREIGN PATENT DOCUMENTS

| JP | 3733066 | 1/2006 |
| JP | 2007-107037 | 4/2007 |
| JP | 2008010320 A * | 1/2008 |
| WO | 01/29912 | 10/2000 |

* cited by examiner

CURRENT COLLECTOR, ANODE, AND BATTERY

CROSS REFERENCES TO RELATED APPLICATIONS

The present invention contains subject matter related to Japanese Patent Application JP 2007-136815 filed in the Japanese Patent Office on May 23, 2008, the entire contents of which being incorporated herein by reference.

BACKGROUND OF THE INVENTION

1. Field of the Invention

The present invention relates to a current collector containing copper, and an anode and a battery using it.

2. Description of the Related Art

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a lightweight secondary batter capable of providing a high energy density has been developed.

Specially, a secondary battery using insertion and extraction of lithium for charge and discharge reaction (so-called lithium ion secondary battery) is extremely prospective, since such a secondary battery provides a higher energy density compared to a lead battery and a nickel cadmium battery.

The lithium ion secondary battery has a cathode, an anode, and an electrolytic solution. The anode has a structure in which an active material layer is provided on a current collector. The active material layer contains an active material contributing to electrode reaction. As the active material of the anode, a carbon material has been widely used. However, in recent years, as the high performance and the multi functions of the portable electronic devices are developed, further improvement in the battery capacity is demanded. Thus, it has been considered to use silicon instead of the carbon material. Since the theoretical capacity of silicon (4199 mAh/g) is significantly higher than the theoretical capacity of graphite (372 mAh/g), it is prospected that the battery capacity is thereby highly improved.

However, when silicon as an active material is deposited by vapor-phase deposition method, the active material layer tends to be hardly contacted with the current collector. Thus, according to the contact degree, the active material layer may be separated from the current collector when charge and discharge are repeated. If the active material layer is separated, electrode reaction of the anode is inhibited by lowering of the current collection characteristics or the like. In the result, the cycle characteristics as important characteristics of secondary batteries are lowered.

Therefore, to improve the cycle characteristics even when silicon is used as the active material of the anode, various devices have been invented. Specifically, a technique using a current collector having an extension coefficient of 13% or more (for example, refer to Japanese Unexamined Patent Application Publication No. 2005-135856), a technique using a current collector having arithmetic average roughness Ra of from 0.01 μm to 1 μm (for example, refer to Japanese Patent No. 3733066), a technique using a current collector having a tensile strength of 3.82 N/mm or more and having arithmetic average roughness Ra of from 0.01 μm to 1 μm (for example, refer to International Publication No. WO 01/29912) and the like have been proposed.

SUMMARY OF THE INVENTION

The recent portable electronic devices increasingly tend to become small, and the high performance and the multi functions tend to be increasingly developed. Accordingly, there is a tendency that charge and discharge of the secondary battery are frequently repeated, and thus the cycle characteristics are easily lowered. In particular, in the lithium ion secondary battery in which silicon is used as the active material of the anode to attain a high capacity, the active material layer is easily separated from the current collector due to expansion and shrinkage of the active material in charge and discharge as well, and accordingly the cycle characteristics are easily lowered significantly. Thus, further improvement of the cycle characteristics of the secondary battery is aspired.

In view of the foregoing, in the invention, it is desirable to provide a current collector, an anode, and a battery capable of improving the cycle characteristics.

According to an embodiment of the invention, there is provided a current collector containing copper. In the current collector, ratio I (200)/I (111) between intensity I (200) of a peak originated in (200) crystal plane of copper obtained by X-ray diffraction and intensity I (111) of a peak originated in (111) crystal plane thereof is in the range from 0.5 to 1.5.

According to an embodiment of the invention, there is provided an anode including a current collector and an active material layer provided thereon. In the anode, the current collector contains copper, and ratio I (200)/I (111) between intensity I (200) of a peak originated in (200) crystal plane of copper obtained by X-ray diffraction and intensity I (111) of a peak originated in (111) crystal plane thereof is in the range from 0.5 to 1.5.

According to an embodiment of the invention, there is provided a battery including a cathode, an anode, and an electrolytic solution. The anode includes a current collector and an active material layer provided thereon. In the battery, the current collector contains copper, and ratio I (200)/I (111) between intensity I (200) of a peak originated in (200) crystal plane of copper obtained by X-ray diffraction and intensity I (111) of a peak originated in (111) crystal plane thereof is in the range from 0.5 to 1.5.

According to the current collector and the anode of the embodiment of the invention, the current collector contains copper, and the intensity ratio I (200)/I (111) between the intensities of the peaks originated in the crystal planes of copper obtained by X-ray diffraction is in the range from 0.5 to 1.5. Thus, the contact characteristics between the current collector and the active material layer are improved. Therefore, according to the battery using the current collector or the anode of the embodiment of the invention, the cycle characteristics may be improved.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
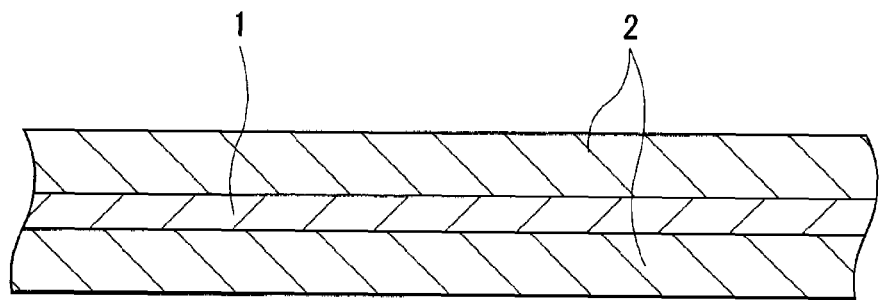
FIG. 1 is a cross section showing a structure of an anode using a current collector according to an embodiment of the invention.

FIG. 1 shows a cross sectional structure of an anode using a current collector according to an embodiment of the invention. The anode is used, for example, for an electrochemical device such as a battery. The anode has an anode current collector 1 having a pair of opposed faces and an anode active material layer 2 provided thereon.

The anode current collector 1 is made of a metal material having favorable electrochemical stability, a favorable electric conductivity, and a favorable mechanical strength, and contains copper. The anode current collector 1 contains copper for the following reasons. Firstly, copper has a high electric conductivity among metal materials, and a high electric conductivity is thereby obtained. Secondary, when an electrode reactant (for example, lithium) is a material not forming an intermetallic compound with copper, lowering of the current collectivity characteristics and separation of the anode active material layer 2 is prevented even on the case that the anode active material layer 2 is expanded or shrunk when an electrochemical device is operated (for example, a battery is charged and discharged). Thirdly, when the anode active material layer 2 is a material being alloyed with copper, the contact characteristics between the anode current collector 1 and the anode active material layer 2 are improved, and thus separation of the anode active material layer 2 is prevented.

The anode current collector 1 may contain other metal element together with copper. The other types of metal elements may be voluntarily selected according to conditions such as a purpose of the anode. In this case, the current collector 1 is not limited to simple substance of copper, but may be an alloy or other compound.

The anode current collector 1 may have a single layer structure or a multilayer structure. In the case where the anode current collector 1 has the multilayer structure, it is preferable that the layer adjacent to the anode active material layer 2 is made of a metal material being alloyed with the anode active material layer 2, and layers not adjacent to the anode active material layer 2 are made of other metal material.

In particular, in the anode current collector 1, ratio (intensity ratio) I (200)/I (111) between intensity I (200) of the peak originated in (200) crystal plane of copper obtained by X-ray diffraction and intensity I (111) of the peak originated in (111) crystal plane thereof is in the range from 0.5 to 1.5. In this case, the contact characteristics between the anode current collector 1 and the anode active material layer 2 are improved more than in the case that the intensity ratio I (200)/I (111) is out of the foregoing range, and therefore separation of the anode active material layer 2 is suppressed. In this case, in particular, even when the anode active material layer 2 contains silicon formed by vapor-phase deposition method, sufficient contact characteristics may be obtained. The intensity ratio I (200)/I (111) is calculated by analyzing the anode current collector 1 with the use of X-ray diffraction (XRD) device and measuring two intensities I (200) and I (111).

The anode current collector 1 has a plurality of copper crystallites. The crystallites are identified by, for example, observing a cross section of the anode current collector 1 with the use of a scanning electron microscope (SEM) or the like. The cross-section area of each crystallite is preferably 100 $\mu m^2$ or less. Thereby, the contact characteristics between the anode current collector 1 and the anode active material layer 2 are more improved. "The cross-section area of each crystallite" means a cross-section area occupied by each crystallite when, for example, the plurality of copper crystallites are identified in an SEM photograph (secondary electron image). The cross-section area is measured by, for example, exposing a cross section of the anode current collector 1 by a cross section polisher, and then observing the cross section with the use of a low-accelerated voltage SEM.

In the case that the anode active material layer 2 is expanded or shrunk when an electrochemical device is operated, the extension (flexibility) of the anode current collector 1 is extremely important. From this view, the extension coefficient of the anode current collector 1 is preferably in the range from 1% to 10%. In the case that the extension coefficient is smaller than 1%, the stress generated when the anode active material layer 2 is expanded and shrunk is hardly relaxed by the flexibility of the anode current collector 1, and thus the anode active material layer 2 may be separated. In the case that the extension coefficient is larger than 10%, a wrinkle may be generated in the anode current collector 1 when the anode active material layer 2 is expanded and shrunk. In addition, the Young's modulus of the anode current collector 1 is preferably in the range from $5 \times 10^7$ MPa to $5 \times 10^9$ MPa, because the contact characteristics between the anode current collector 1 and the anode active material layer 2 are thereby improved.

The surface of the anode current collector 1 is preferably roughened. Thereby, due to the so-called anchor effect, the contact characteristics between the anode current collector 1 and the anode active material layer 2 are improved. In this case, it is enough that at least the surface of the anode current collector 1 opposed to the anode active material layer 2 is roughened. As a roughening method, for example, a method of forming fine particles by electrolytic treatment and the like is cited. The electrolytic treatment is a method of providing concavity and convexity by forming fine particles on the surface of a metal by electrolytic method in an electrolytic bath. When the metal is a copper foil, the copper foil provided with the electrolytic treatment is generally called "electrolytic copper foil."

Ten point height of roughness profile Rz of the surface of the anode current collector 1 is preferably in the range from 1.5 μm to 5.5 μm. If the ten point height of roughness profile Rz is smaller than 1.5 μm, the contact characteristics between the anode current collector 1 and the anode active material layer 2 may be lowered. Meanwhile, if the ten point height of roughness profile Rz is larger than 5.5 μm, there is a possibility that a favorable particle shape is not able to be obtained when the anode active material is deposited. The definition of the ten point height of roughness profile Rz is based on JIS B 0601.

Figure 2:
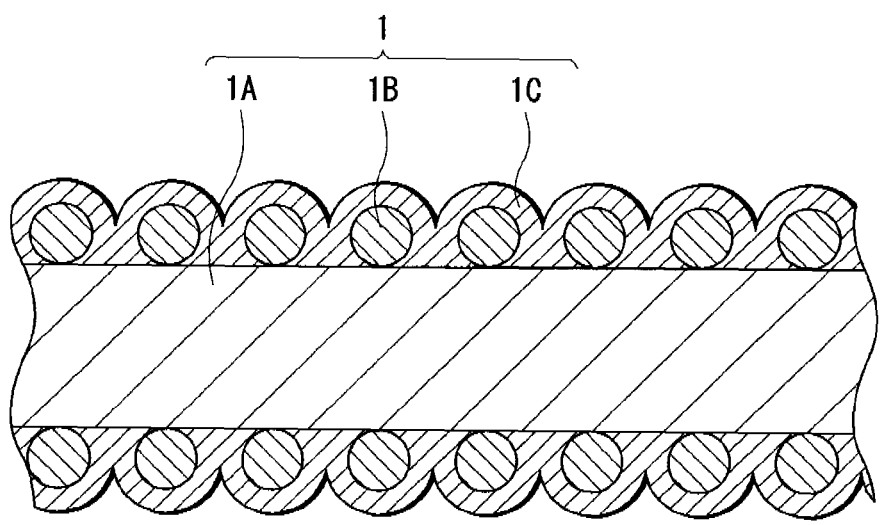
FIG. 2 is a schematic cross section showing enlarged part of the anode current collector shown in FIG. 1.

FIG. 2 is a schematic view of an enlarged part of the anode current collector 1 shown in FIG. 1. In the case where the anode current collector 1 is made of an electrolytic copper foil, the anode current collector 1 has, for example, a metal foil (so-called original foil) 1A and a plurality of fine particles 1B formed on the surface (for example, the both faces) thereof. In this case, the plurality of fine particles 1B may be fixed to the original foil 1A by being covered with a plated film 1C. Thereby, a plurality of projections are provided for every position of the fine particle 1B on the surface of the anode current collector 1. The plated film 1C is formed by, for example, covering plating or burn plating.

The thickness of the original foil 1A is preferably in the range from 10 μm to 25 μm. If the thickness is smaller than 10 μm, the ratio occupied by the anode active material layer 2 is large in the case where the volume of the entire anode is constant and thus such a thickness is preferable to improve the anode performance, while there is a possibility that the anode is subject to thermal damage when forming the anode active material layer 2 by using evaporation method or the like associated with high heat. Meanwhile, if the thickness is larger than 25 μm, the flexibility of the entire anode is lowered and thus the anode performance may be lowered.

The anode active material layer 2 contains a plurality of anode active material particles containing silicon as an anode active material capable of inserting and extracting an electrode reactant. Silicon has the high ability to insert and extract the electrode reactant, and thereby provides a high energy density. The anode active material particle may be the simple substance, an alloy, or a compound of silicon; or a material having one or more phases thereof at least in part. One thereof may be used singly, or two or more thereof may be used by mixing. In the invention, "alloys" also include an alloy containing one or more metal elements and one or more metalloid elements, in addition to an alloy composed of two or more metal elements. It is needless to say that the "alloy" may contain a nonmetallic element. The texture thereof may be a solid solution, a eutectic crystal (eutectic mixture), an intermetallic compound, or a texture in which two or more of the foregoing textures coexist.

As the alloy of silicon, for example, an alloy having at least one selected from the group consisting of tin (Sn), nickel, copper, iron, cobalt, manganese (Mn), zinc, indium (In), silver (Ag), titanium, germanium (Ge), bismuth (Bi), antimony (Sb), and chromium as an element other than silicon is cited As the compound of silicon, for example, a compound having oxygen and carbon (C) as an element other than silicon is cited. The compound of silicon may contain, for example, one or more of elements described for the alloy of silicon as an element other than silicon.

The anode active material particle is linked to the anode current collector 1. The anode active material particle is grown from the surface of the anode current collector 1 in the thickness direction of the anode active material layer 2. In this case, it is preferable that the anode active material particle is formed by vapor-phase deposition method, and at least part of the interface between the anode current collector 1 and the anode active material layer 2 is alloyed as described above. Specifically, at the interface thereof, the element of the anode current collector 1 may be diffused in the anode active material particle, or the element of the anode active material particle may be diffused in the anode current collector 1, or both elements may be diffused therein each other. Thereby, breakage due to expansion and shrinkage of the anode active material layer 2 hardly occurs when the electrochemical device is operated, and the electron conductivity between the anode current collector 1 and the anode active material layer 2 is improved.

As the foregoing vapor-phase deposition method, for example, physical deposition method or chemical deposition method is cited. More specifically, vacuum evaporation method, sputtering method, ion plating method, laser ablation method, thermal chemical vapor deposition (CVD) method, plasma CVD method and the like are cited.

The anode active material particle may have a single layer structure by being formed through a single deposition step. Otherwise, the anode active material particle may have a multilayer structure in the particle by being formed through a plurality of deposition steps. However, to prevent the anode current collector 1 from being excessively damaged thermally in the case where the anode active material particle is deposited by evaporation method or the like associated with high heat in the deposition step, the anode active material particle preferably has the multilayer structure. In the case where the deposition step of the anode active material particle is divided into several steps (the anode active material particles are sequentially deposited and layered), time that the anode current collector 1 is exposed at high heat is reduced compared to a case that the anode active material particle is deposited by a single deposition step.

The anode active material particle preferably contains oxygen together with silicon, since thereby expansion and shrinkage of the anode active material layer 2 are prevented. In this case, at least part of oxygen is preferably bonded to part of silicon. The bonding state may be in the form of silicon monoxide, silicon dioxide, or in the form of other metastable state.

The oxygen content in the anode active material particle is preferably in the range from 3 atomic % to 40 atomic %, since thereby higher effects may be obtained. More specifically, if the oxygen content is smaller than 3 atomic %, there is a possibility that expansion and shrinkage of the anode active material layer 2 are not sufficiently prevented. Meanwhile, if the oxygen content is larger than 40 atomic %, the resistance may be excessively increased. In the case where the anode is used together with an electrolytic solution in an electrochemical device, the anode active material particle does not include a coat formed by decomposition reaction of the electrolytic solution and the like. That is, when the oxygen content in the anode active material particle is calculated, oxygen in such a coat described above is not included in the calculation.

The anode active material particle containing oxygen is formed by continuously introducing oxygen gas into a chamber when the anode active material particle is formed by vapor-phase deposition method. In particular, when a desired oxygen content is not obtained only by introducing the oxygen gas, a liquid (for example, moisture vapor or the like) may be introduced into the chamber as a supply source of oxygen.

Further, the anode active material particle may contain a metal element together with silicon. Thereby, expansion and shrinkage of the anode active material layer 2 are prevented. As the metal element, for example, at least one metal element selected from the group consisting of iron, cobalt, nickel, titanium, chromium, and molybdenum is cited. The content of metal element in the anode active material particle may be voluntarily set. However, in the case of using the anode for a battery, an excessively high content of the metal element is not practical, since in such a case, the thickness of the anode active material layer 2 should be increased to obtain a desired battery capacity, and thereby separation and cracks of the anode active material layer 2 may be easily caused.

The anode active material particle having the foregoing metal element may be formed by, for example, using an evaporation source mixed with the metal element or using multiple evaporation sources when the anode active material particle is formed by evaporation method as vapor-phase deposition method.

Further, the anode active material particle preferably has an oxygen-containing region in which the anode active material particle contains oxygen together with silicon in the thickness direction, and the oxygen content in the oxygen-containing region is preferably larger than the oxygen content in the other regions. Thereby, expansion and shrinkage of the anode active material layer 2 are prevented. It is possible that the regions other than the oxygen-containing region also contains oxygen, or do not contain oxygen. It is needless to say that in the case where the regions other than the oxygen-containing region also contain oxygen, the oxygen content thereof is lower than the oxygen content in the oxygen-containing region.

In this case, to further prevent expansion and shrinkage of the anode active material layer 2, the regions other than the oxygen-containing region preferably also contain oxygen, and the anode active material particle preferably includes a first oxygen-containing region (region having the lower oxygen content) and a second oxygen-containing region having the higher oxygen content than that of the first oxygen-containing region (region having the higher oxygen content). In particular, it is preferable that the second oxygen-containing region is sandwiched between the first oxygen-containing regions. It is more preferable that the first oxygen-containing region and the second oxygen-containing region are alternately and repeatedly layered. Thereby, higher effects may be obtained. The oxygen content in the first oxygen-containing region is preferably small as much as possible. The oxygen content in the second oxygen-containing region is, for example, similar to the oxygen content in the case that the anode active material particle contains oxygen described above.

The anode active material particle including the first oxygen-containing region and the second oxygen-containing region may be formed, for example, by intermittently introducing oxygen gas into a chamber when the anode active material particle is formed by vapor-phase deposition method. It is needless to say that when a desired oxygen content is not able to be obtained only by introducing the oxygen gas, liquid (for example, moisture vapor or the like) may be introduced into the chamber.

It is possible that the oxygen content of the first oxygen-containing region is clearly different from the oxygen content of the second oxygen-containing region, or the oxygen content of the first oxygen-containing region is not clearly different from the oxygen content of the second oxygen-containing region. In particular, in the case where the introduction amount of the foregoing oxygen gas is continuously changed, the oxygen content may be continuously changed. In the case where the introduction amount of the oxygen gas is intermittently changed, the first oxygen-containing region and the second oxygen-containing region become so-called "layers." Meanwhile, in the case where the introduction amount of the oxygen gas is continuously changed, the first oxygen-containing region and the second oxygen-containing region become "lamellar state" rather than "layers." In the latter case, the oxygen content in the anode active material particle is distributed with repeated increase and decrease. In this case, it is preferable that the oxygen content is gradually or continuously changed between the first oxygen-containing region and the second oxygen-containing region. If the oxygen content is changed drastically, the ion diffusion characteristics may be lowered, or the resistance may be increased.

In particular, the anode active material layer 2 preferably contains a metal containing a metal element not being alloyed with the electrode reactant together with the anode active material particle. Since each anode active material particle is bound to each other through the metal, expansion and shrinkage of the anode active material layer 2 are prevented. "Metal" is a comprehensive term, and thus the metal may be one of a simple substance, an alloy, and a compound, as long as the metal contains a metal element not being alloyed with the electrode reactant. In this case, in particular, even when the anode active material particle is formed by vapor-phase deposition method or the like, high binding characteristics may be obtained. Examples of the metal elements include, for example, at least one selected from the group consisting of iron, cobalt, nickel, zinc, and copper.

As described above, the metal is provided in a gap between adjacent anode active material particles, in the case that the anode active material particle is grown from the surface of the anode current collector 1 in the thickness direction of the anode active material layer 2. Further, for example, the metal covers at least part of the exposed face of the anode active material particle, that is, at least part of the surface of the anode active material particle not adjacent to other anode active material particle. Furthermore, when the anode active material particle has a multilayer structure in the particle, the metal is provided in a gap in the particle.

Figure 3A:
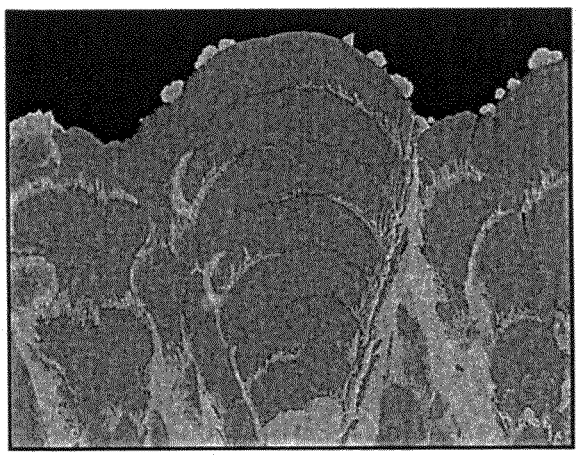
FIGS. 3A and 3B are an SEM photograph showing a cross sectional structure of the anode shown in FIG. 1 and a schematic view thereof.
Figure 3B:
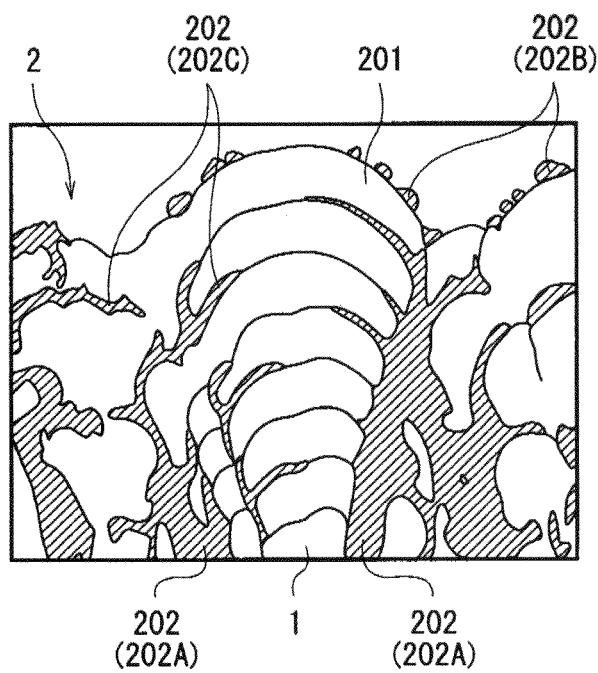

FIGS. 3A and 3B show an enlarged part of the anode shown in FIG. 1. FIG. 3A is an SEM photograph, and FIG. 3B is a schematic drawing of the SEM image shown in FIG. 3A. In FIG. 3A, the non-hatched section in FIG. 3B is an anode active material particle 201, and the hatched section in FIG. 3B is a metal 202. FIGS. 3A and 3B show a case that the anode active material particle 201 has the multilayer structure in the particle.

As shown in FIGS. 3A and 3B, the anode active material particle 201 deposited several times on the surface of the anode current collector 1 has the multilayer structure in the particle. In this case, the surface of the anode current collector 1 is roughened (a plurality of projections exist on the surface of the anode current collector 1). Thus, the anode active material particle 201 is gradually grown in the thickness direction for every projection. For example, the metal material 202 is provided in the gap between adjacent anode active material particles 201 (metal 202A), the metal 202 partly covers the exposed face of the anode active material particle 201 (metal 202B), and the metal 202 is provided in the gap in the anode active material particle 201 (metal 202C).

The metal 202A fills the gap between adjacent anode active material particles to improve the binding characteristics of the anode active material layer 2. More specifically, in the case where the anode active material particle 201 is formed by vapor-phase deposition method or the like, the anode active material particles 201 are grown for every projection existing on the surface of the anode current collector 1 as described above, and thus the gap is generated between the adjacent anode active material particles 201. The gap causes lowering of the binding characteristics of the anode active material layer 2. Therefore, to improve the binding characteristics, the metal 202A fills in the foregoing gap. In this case, it is enough that part of the gap is filled therewith, but the larger filling amount is preferable, since thereby the binding characteristics of the anode active material layer 2 are more improved. The filling amount of the metal material 202A is preferably 20% or more, more preferably 40% or more, and much more preferably 80% or more.

To prevent a fibrous minute projection (not shown) generated on the exposed face of the uppermost layer of the anode active material particle 201 from adversely affecting the performance of the electrochemical device, the metal 202B covers such a projection. More specifically, in the case where the anode active material particle 201 is formed by vapor-phase deposition method or the like, the fibrous minute projections are generated on the surface thereof, and thus a void is generated between the projections. The void causes increase of the surface area of the anode active material particle 201, and accordingly the amount of an irreversible coat formed on the surface is also increased, possibly resulting in lowering of progression of the electrode reaction. Therefore, to avoid the lowering of progression of the electrode reaction, the foregoing void is filled with the metal 202B. In this case, it is enough at minimum that part of the void is filled therewith, but the larger filling amount is preferable, since thereby the lowering of progression of the electrode reaction is more suppressed. In FIGS. 3A and 3B, the metal 202B is dotted on the surface of the uppermost layer of the anode active material particle 201, which means that the foregoing minute projection exists in the location where the metal 202B is dotted.

The metal 202C intrudes into the gap in the anode active material particle 201 to improve the biding characteristics of the anode active material layer 2. More specifically, in the case where the anode active material particle 201 has a multilayer structure, a gap is generated between each layer. The gap may cause lowering of the biding characteristics of the anode active material layer 2 as well as the foregoing gap between adjacent anode active material particles 201 may do. Therefore, to improve the biding characteristics, the foregoing gap is filled with the metal 202C. In this case, it is enough that part of the gap is filled therewith, but the larger filling amount is preferable, since thereby the binding characteristics of the anode active material layer 2 are more improved.

In particular, the metal material 202C has a function similar to that of the metal 202B. More specifically, in the case where the anode active material particle 201 is deposited several times and thereby layered, the foregoing minute projection is generated on the surface of the anode active material particle 201 for every deposition. Therefore, the metal 202C fills in not only the gap in the anode active material particle 201, but also the foregoing minute void.

The metal is formed by, for example, at least one selected from the group consisting of vapor-phase deposition method and liquid-phase deposition method. Specially, the metal is preferably formed by liquid-phase deposition method. Thereby, the gap described with reference to FIGS. 3A and 3B is easily filled with the metal. In addition, in this case, the metal easily fills in the void.

Examples of the foregoing vapor-phase deposition method include, for example, a method similar to that used in forming the anode active material particle. Examples of the liquid-phase deposition method include, for example, plating method such as electrolytic plating method and electroless plating method. Specially, as the liquid-phase deposition method, electrolytic plating method is more preferable than electroless plating method. Thereby, higher effects may be obtained.

The ratio (molar ratio) M2/M1 between the number of moles M1 per unit area of the anode active material particle and the number of moles M2 per unit area of the metal is preferably in the range from 1/15 to 3/1. The ratio of the number of atoms occupied by the metal (occupancy ratio of the metal) on the surface of the anode is preferably in the range from 2 atomic % to 30 atomic %. Thereby, expansion and shrinkage of the anode active material layer 2 are prevented. The occupancy ratio of the metal may be measured by, for example, performing element analysis of the anode surface with the use of, for example, energy dispersive X-ray fluorescence spectroscopy (EDX).

Further, the metal may have oxygen, since thereby expansion and shrinkage of the anode active material layer 2 are more suppressed. The oxygen content in the metal may be voluntarily set. The metal containing oxygen may be formed, for example, by a procedure similar to that used in forming the anode active material particle containing oxygen.

The anode is formed, for example, by the following procedure.

First, the anode current collector 1 containing copper is prepared. After that, the plurality of anode active material particles containing silicon are formed on the anode current collector 1 by using vapor-phase deposition method or the like. The anode current collector 1 may be prepared by providing electrolytic treatment for the original foil 1A to form the plurality of fine particles 1B and the plated film 1C. Further, the anode active material particle may be formed into a single layer structure by one time deposition step, or a multilayer structure by a plurality of deposition steps. After that, the metal that has a metal element not being alloyed with the electrode reactant is formed by liquid-phase deposition method or the like. Thereby, the metal intrudes into a gap between adjacent anode active material particles, and thus the anode active material layer 2 is formed. In this case, for example, at least part of the exposed face of the anode active material particle is covered with the metal. Meanwhile, for example, in the case where the anode active material particle is formed into the multilayer structure, the metal intrudes into a gap in the anode active material particle.

In particular, when the anode is manufactured, by heating (so-called annealing) the anode current collector 1 in a given step, the intensity ratio I (200)/I (111) between the intensities of the peaks originated in the copper crystal planes obtained by X-ray diffraction is set in the range from 0.5 to 1.5. In this case, annealing may be performed before or after the anode active material layer 2 is formed. Annealing temperatures of the anode current collector 1 may be voluntarily set according to the value of the foregoing intensity ratio I (200)/I (111).

Further, it is preferable that the original foil 1A having a thickness of from 10 μm to 25 μm is used, and the anode current collector having an extension coefficient of from 1% to 10% and Young's modulus of from $5 \times 10^7$ MPa to $5 \times 10^9$ MPa is used. In this case, it is preferable that the original foil 1A is annealed to set the cross-section area of each copper crystallite to 100 μm$^2$ or less. Annealing temperature of the original foil 1A may be voluntarily set according to the foregoing value of the cross-section area.

According to the anode using the current collector, the anode current collector 1 contains copper, and the intensity ratio I (200)/I (111) between the intensities of the peaks originated in the copper crystal planes obtained by X-ray diffraction is in the range from 0.5 to 1.5. Therefore, the contact characteristics between the anode current collector 1 and the anode active material layer 2 are improved more than in the case that the intensity ratio I (200)/I (111) is out of the foregoing range. Thereby, the anode active material layer 2 is prevented from being separated from the anode current collector 1. In this case, if the anode current collector 1 is made of the electrolytic copper foil, in the case that the contact characteristics between the anode current collector 1 (plated film 1C) and the anode active material layer 2 are sufficient, the plated film 1C is prevented from being separated from the original foil 1A and the fine particle 1B, and the fine particle 1B and the plated film 1C are prevented from being separated from the original foil 1A as well. Accordingly, the electric characteristics such as the electric conductivity may be improved. In particular, if the anode active material particle of the anode active material layer 2 contains silicon and the anode active material particle is deposited by vapor-phase deposition method, the contact characteristics are easily lowered due to expansion and shrinkage of the anode active material layer 2. In this case, the anode using the anode current collector is used, significant effects may be obtained.

Further, when the cross-section area of the copper crystallite is 100 μm$^2$ or less, or the thickness of the original foil 1A is in the range from 10 μm to 25 μm, or the extension coefficient of the anode current collector 1 is in the range from 1% to 10% and the Young's modulus thereof is in the range from $5 \times 10^7$ MPa to $5 \times 10^9$ MPa, or the ten point height of roughness profile Rz of the surface of the anode current collector 1 is in the range from 1.5 μm to 5.5 μm, higher effects may be obtained. In addition, at least part of the interface between the anode current collector 1 and the anode active material layer 2 is alloyed, higher effects may be obtained.

Further, in the case that the anode active material layer 2 has the plurality of anode active material particles containing silicon, if the anode active material particles further contain oxygen and the oxygen content in the anode active materials is in the range from 3 atomic % to 40 atomic %, or if the anode active material particles further have the oxygen-containing region containing oxygen in the thickness direction and the oxygen content in the oxygen-containing region is higher than that of the other regions, higher effects may be obtained.

Further, if the anode active material layer 2 has the metal containing the metal element not being alloyed with the electrode reactant in the gap between the anode active material particles, each anode active material particle is bound to each other through the metal, and thus pulverization and falling of the anode active material layer 2 may be prevented. In particular, if the metal covers at least part of the exposed face of the anode active material particle, the adverse effect by the fibrous minute projection generated on the exposed face may be prevented. Further, in the case that the anode active material particle has the multilayer structure in the particle, if the anode active material layer 2 has the metal in the gap in the particle, pulverization and falling of the anode active material layer 2 may be prevented as in the case that the anode active material layer 2 has the metal in the gap between the anode active material particles as described above. In this case, when the molar ratio M2/M1 between the anode active material particle and the metal is in the range from 1/15 to 3/1, or the occupancy ratio of the metal on the surface of the anode active material layer 2 is in the range from 2 atomic % to 30 atomic %, higher effects may be obtained. Further, when the metal is formed by liquid-phase deposition method, the metal easily intrudes into the gap between each anode active material particle and a gap in the anode active material particle, and the metal easily fills in a void between the fibrous minute projections, and thus higher effects may be obtained.

Next, a description will be hereinafter given of a usage example of the foregoing anode. As an example of the electrochemical devices, batteries are herein taken. The anode is used for the batteries as follows.

First Battery

Figure 4:
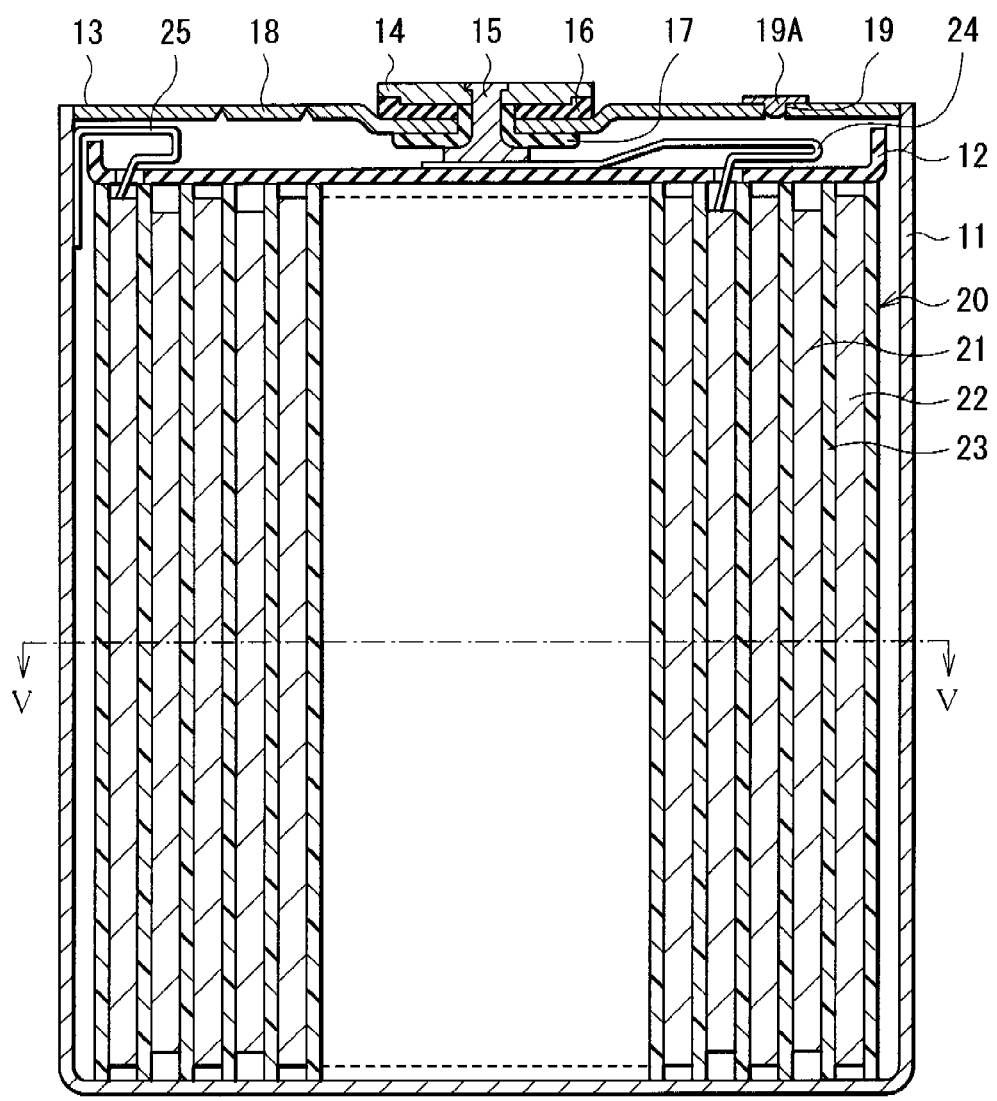
FIG. 4 is a cross section showing a structure of a first battery including the anode according to the embodiment of the invention.
Figure 5:
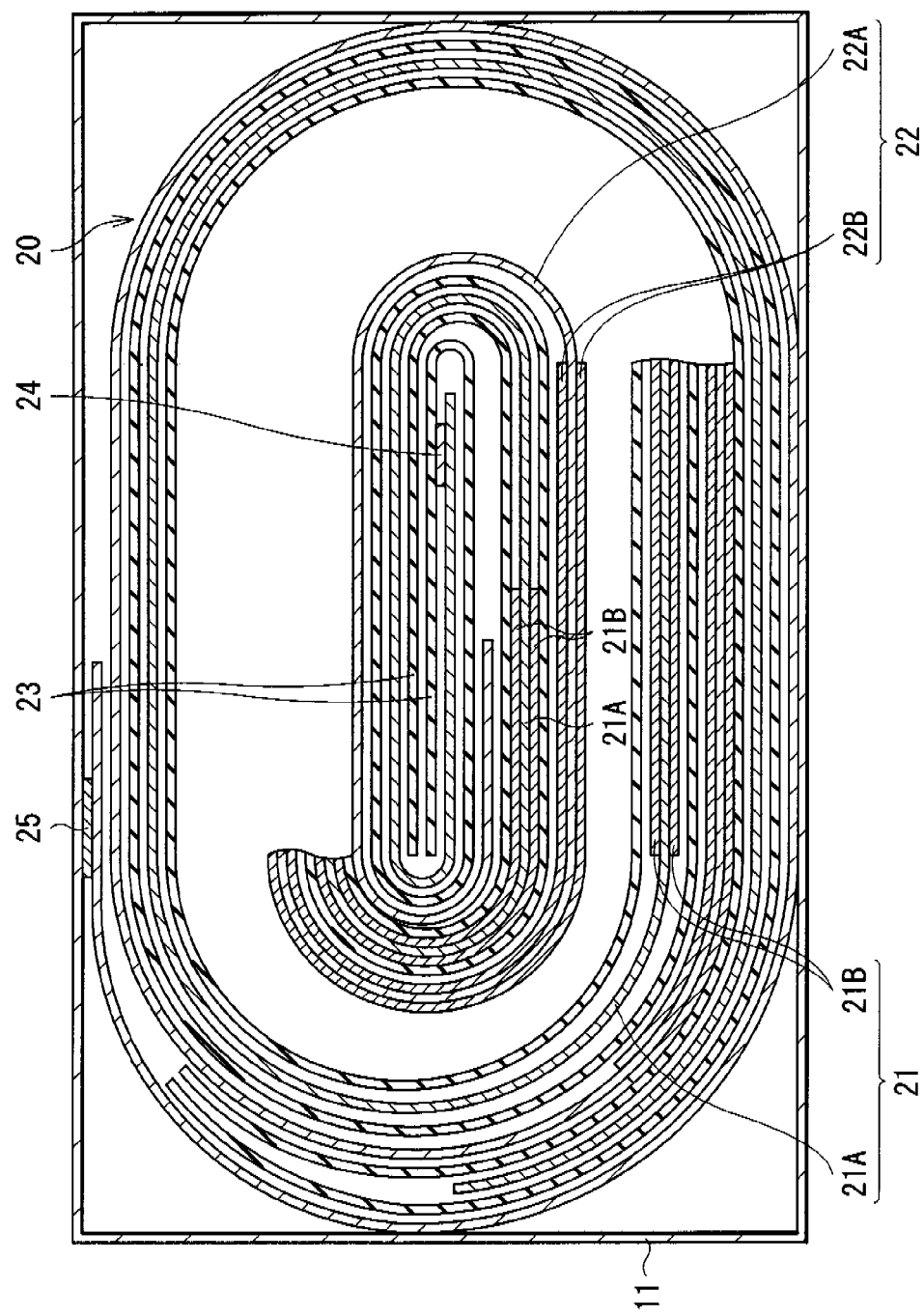
FIG. 5 is a cross section taken along line V-V of the first battery shown in FIG. 4.

FIG. 4 and FIG. 5 show a cross sectional structure of a first battery. FIG. 5 shows a cross section taken along line V-V shown in FIG. 4. The battery herein described is, for example, a lithium ion secondary battery in which the capacity of an anode 22 is expressed based on insertion and extraction of lithium as an electrode reactant.

The secondary battery contains a battery element 20 having a flat spirally wound structure inside a battery can 11.

The battery can 11 is, for example, a square package member. The battery structure including the battery can 11 is the so-called square structure. As shown in FIG. 5, the square package member has a shape with the cross section in the longitudinal direction of a rectangle or an approximate rectangle (including curved lines in part). The battery can 11 structures not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 5 shows a case that the battery can 11 has a rectangular cross sectional shape.

The battery can 11 is made of, for example, a metal material containing iron, aluminum (Al), or an alloy thereof. The battery can 11 may have a function as an anode terminal as well. In this case, to inhibit the secondary battery from being swollen by using the rigidity (hardly deformable characteristics) of the battery can 11 when charged and discharged, the battery can 11 is preferably made of rigid iron (or the alloy thereof) than aluminum. When the battery can 11 is made of iron, for example, the iron may be plated by nickel (Ni) or the like.

The battery can 11 also has a hollow structure in which one end of the battery can 11 is closed and the other end thereof is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicularly to the spirally wound circumferential face of the battery element 20, and is made of, for example, polypropylene or the like. The battery cover 13 is, for example, made of a material similar to that of the battery can 11, and also has a function as an anode terminal as the battery can 11 does.

Outside of the battery cover 13, a terminal plate 14 as a cathode terminal is arranged. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin 15 is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. When the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless ball.

The battery element 20 is formed by layering a cathode 21 and the anode 22 with a separator 23 in between and then spirally winding the resultant laminated body. The battery element 20 is flat according to the shape of the battery can 11. A cathode lead 24 made of aluminum or the like is attached to an end of the cathode 21 (for example, the internal end thereof). An anode lead 25 made of nickel or the like is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on the both faces of a strip-shaped cathode current collector 21A. The cathode current collector 21A is made of, for example, a metal material such as aluminum, nickel, and stainless. The cathode active material layer 21B contains a cathode active material, and if necessary, may also contain a binder, a conductive material and the like.

The cathode active material contains one or more cathode materials capable of inserting and extracting lithium as an electrode reactant. As the cathode material, for example, a lithium complex oxide such as lithium cobalt oxide, lithium nickel oxide, a solid solution containing them ($Li(Ni_x Co_y Mn_z)O_2$, values of x, y, and z are respectively expressed as $0<x<1$, $0<y<1$, $0<z<1$, and $x+y+z=1$), lithium manganese oxide having a spinel structure ($LiMn_2O_4$), and a solid solution thereof ($Li(Mn_{2-v}Ni_v)O_4$, a value of v is expressed as $v<2$). Further, as the cathode material, for example, a phosphate compound having an olivine structure such as lithium iron phosphate ($LiFePO_4$) is cited. Thereby, a high energy density may be obtained. In addition, as the cathode material, for example, an oxide such as titanium oxide, vanadium oxide, and manganese dioxide; a disulfide such as iron disulfide, titanium disulfide, and molybdenum sulfide; sulfur; a conductive polymer such as polyaniline and polythiophene is cited.

The anode 22 has a structure similar to that of the anode using the foregoing current collector. For example, in the anode 22, an anode active material layer 22B is provided on the both faces of a strip-shaped anode current collector 22A. The structures of the anode current collector 22A and the anode active material layer 22B are respectively similar to the structures of the anode current collector 1 and the anode active material layer 2. The charge capacity of the anode active material capable of inserting and extracting lithium is preferably larger than the charge capacity of the cathode.

The separator 23 separates the cathode 21 from the anode 22, and passes ions as an electrode reactant while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more porous films as the foregoing porous films are layered.

An electrolytic solution as a liquid electrolyte is impregnated in the separator 23. The electrolytic solution contains, for example, a solvent and an electrolyte salt dissolved therein.

The solvent contains, for example, one or more nonaqueous solvents such as an organic solvent. The nonaqueous solvents include, for example, an ester-based carbonate solvent such as ethylene carbonate, propylene carbonate, butylene carbonate, dimethyl carbonate, diethyl carbonate, ethyl methyl carbonate, and methylpropyl carbonate. Thereby, superior capacity characteristics, superior storage characteristics, and superior cycle characteristics are obtained. One thereof may be used singly, or two or more thereof may be used by mixing. Specially, as the solvent, a mixture of a high-viscosity solvent such as ethylene carbonate and propylene carbonate and a low-viscosity solvent such as dimethyl carbonate, ethyl methyl carbonate, and diethyl carbonate is preferable. Thereby, the dissociation property of the electrolyte salt and the ion mobility are improved, and thus higher effects may be obtained.

In particular, the solvent preferably contains halogenated ester carbonate, since thereby a stable coat is formed on the surface of the anode 22, and thus the decomposition reaction of the electrolytic solution is prevented and the cycle characteristics are improved. As the halogenated ester carbonate, fluorinated ester carbonate is preferable, and difluoroethylene carbonate is more preferable, since thereby higher effects may be obtained. As difluoroethylene carbonate, for example, 4,5-difluoro-1,3-dioxolane-2-one or the like is cited.

Further, the solvent preferably contains a cyclic ester carbonate having an unsaturated bond, since thereby the cycle characteristics are improved. As the cyclic ester carbonate having an unsaturated bond, for example, vinylene carbonate, vinyl ethylene carbonate and the like are cited.

Further, the solvent preferably contains sultone, since thereby the cycle characteristics are improved, and the secondary battery is prevented from being swollen. As the sultone, for example, 1,3-propenesultone or the like is cited.

The electrolyte salt contains, for example, one or more light metal salts such as a lithium salt. As the lithium salt, for example, lithium hexafluorophosphate ($LiPF_6$), lithium perchlorate ($LiClO_4$), lithium hexafluoroarsenate ($LiAsF_6$) or the like is cited. Thereby, superior capacity characteristics, superior storage characteristics, and superior cycle characteristics are obtained. One thereof may be used singly, or two or more thereof may be used by mixing. Specially, as the electrolyte salt, lithium hexafluorophosphate is preferable, since the internal resistance is lowered, and thus higher effects may be obtained.

In particular, the electrolyte salt preferably contains a compound having boron and fluorine, since thereby the cycle characteristics are improved. As the compound having boron and fluorine, for example, lithium tetrafluoroborate or the like is cited.

The content of the electrolyte salt in the solvent is preferably in the range from 0.3 mol/kg to 3.0 mol/kg, since thereby superior capacity characteristics may be obtained.

The secondary battery is manufactured, for example, by the following procedure.

First, the cathode 21 is formed. First, a cathode active material, a binder, and an electrical conductor are mixed to prepare a cathode mixture, which is dispersed in an organic solvent to form paste cathode mixture slurry. Subsequently, the both faces of the cathode current collector 21A are uniformly coated with the cathode mixture slurry by using a doctor blade, a bar coater or the like, which is dried. Finally, the resultant is compression-molded by a rolling press machine or the like while being heated if necessary to form the cathode active material layer 21B. In this case, the resultant may be compression molded over several times.

Next, the anode 22 is formed by forming the anode active material layer 22B on the both faces of the anode current collector 22A by the same procedure as that of forming the anode described above.

Further, the battery element 20 is formed by using the cathode 21 and the anode 22. First, the cathode lead 24 and the anode lead 25 are respectively attached to the cathode current collector 21A and the anode current collector 22A by welding or the like. Subsequently, the cathode 21 and the anode 22 are layered with the separator 23 in between, and spirally wound in the longitudinal direction. After that, the resultant is formed in the flat shape, and thereby the battery element 20 is formed.

Finally, the secondary battery is assembled. That is, after the battery element 20 is contained in the battery can 11, the insulating plate 12 is arranged on the battery element 20. Subsequently, the cathode lead 24 and the anode lead 25 are respectively connected to the cathode pin 15 and the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery shown in FIG. 4 and FIG. 5 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, the contact characteristics between the anode current collector 22A and the anode active material layer 22B are improved. Accordingly, the cycle characteristics may be improved. In this case, the cycle characteristics are improved if the anode 22 contains silicon advantageous for obtaining a high capacity. Thus, higher effects may be thereby obtained compared to a case in which the anode contains other anode material such as a carbon material. Effects of the secondary battery other than the foregoing effects are similar to those of the foregoing anode.

Second Battery

Figure 6:
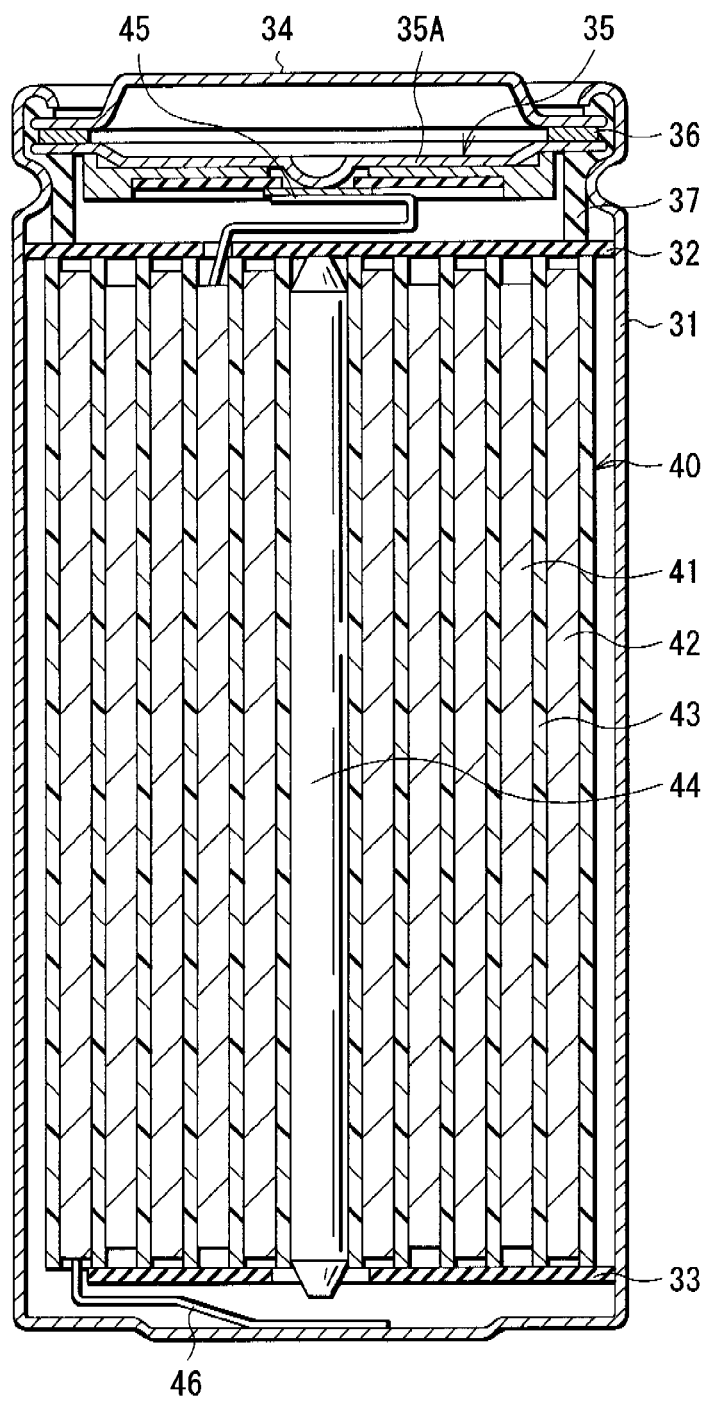
FIG. 6 is a cross section showing a structure of a second battery including the anode according to the embodiment of the invention.
Figure 7:
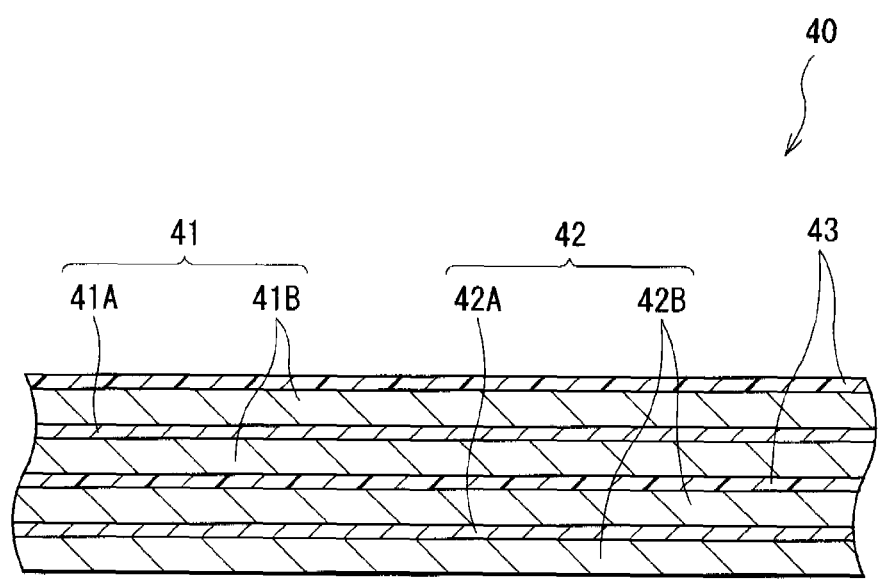
FIG. 7 is a cross section showing an enlarged part of the spirally wound electrode body shown in FIG. 6.

FIG. 6 and FIG. 7 show a cross sectional structure of a second battery. FIG. 7 shows an enlarged part of a spirally wound electrode body 40 shown in FIG. 6. The battery is a lithium ion secondary battery as the foregoing first battery. The second battery contains the spirally wound electrode body 40 in which a cathode 41 and an anode 42 are spirally wound with a separator 43 in between, and a pair of insulating plates 32 and 33 inside a battery can 31 in the shape of an approximately hollow cylinder. The battery structure including the battery can 31 is a so-called cylindrical secondary battery.

The battery can 31 is made of, for example, a metal material similar to that of the battery can 11 in the foregoing first battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a material similar to that of the battery can 31. The safety valve mechanism 35 is electrically connected to the battery cover 34 through the PTC device 36. In the safety valve mechanism 35, when the internal pressure becomes a certain level or more by internal short circuit, external heating or the like, a disk plate 35A flips to cut the electric connection between the battery cover 34 and the spirally wound electrode body 40. When temperature rises, the PTC device 36 increases the resistance and thereby limits a current to prevent abnormal heat generation resulting from a large current. The gasket 37 is made of, for example, an insulating material and its surface is coated with asphalt.

For example, a center pin 44 is inserted in the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on the both faces of a strip-shaped cathode current collector 41A. The anode 42 has a structure similar to that of the foregoing anode, for example, a structure in which an anode active material layer 42B is provided on the both faces of a strip-shaped anode current collector 42A. The structures of the cathode current collector 41A, the cathode active material layer 41B, the anode current collector 42A, the anode active material layer 42B, and the separator 43 and the composition of the electrolytic solution are respectively similar to the structures of the cathode current collector 21A, the cathode active material layer 21B, the anode current collector 22A, the anode active material layer 22B, and the separator 23, and the composition of the electrolytic solution in the foregoing first battery.

The secondary battery is manufactured, for example, as follows.

First, for example, the cathode 41 in which the cathode active material layer 41B is provided on the both faces of the cathode current collector 41A is formed and the anode 42 in which the anode active material layer 42B is provided on the both faces of the anode current collector 42A is formed by respective procedures similar to the procedures of forming the cathode 21 and the anode 22 in the foregoing first battery. Subsequently, the cathode lead 45 is attached to the cathode 41, and the anode lead 46 is attached to the anode 42. Then, the cathode 41 and the anode 42 are spirally wound with the separator 43 in between, and thereby the spirally wound electrode body 40 is formed. The end of the cathode lead 45 is welded to the safety valve mechanism 35, and the end of the anode lead 46 is welded to the battery can 31. After that, the spirally wound electrode body 40 is sandwiched between the pair of insulating plates 32 and 33, and contained in the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery shown in FIG. 6 and FIG. 7 is thereby fabricated.

In the secondary battery, when charged, for example, lithium ions are extracted from the cathode 41 and inserted in the anode 42 through the electrolytic solution. Meanwhile, when discharged, for example, lithium ions are extracted from the anode 42, and inserted in the cathode 41 through the electrolytic solution.

According to the cylindrical secondary battery, the anode 42 has the structure similar to that of the foregoing anode. Thus, the cycle characteristics may be improved. Effects of the secondary battery other than the foregoing effects are similar to those of the first battery.

Third Battery

Figure 8:
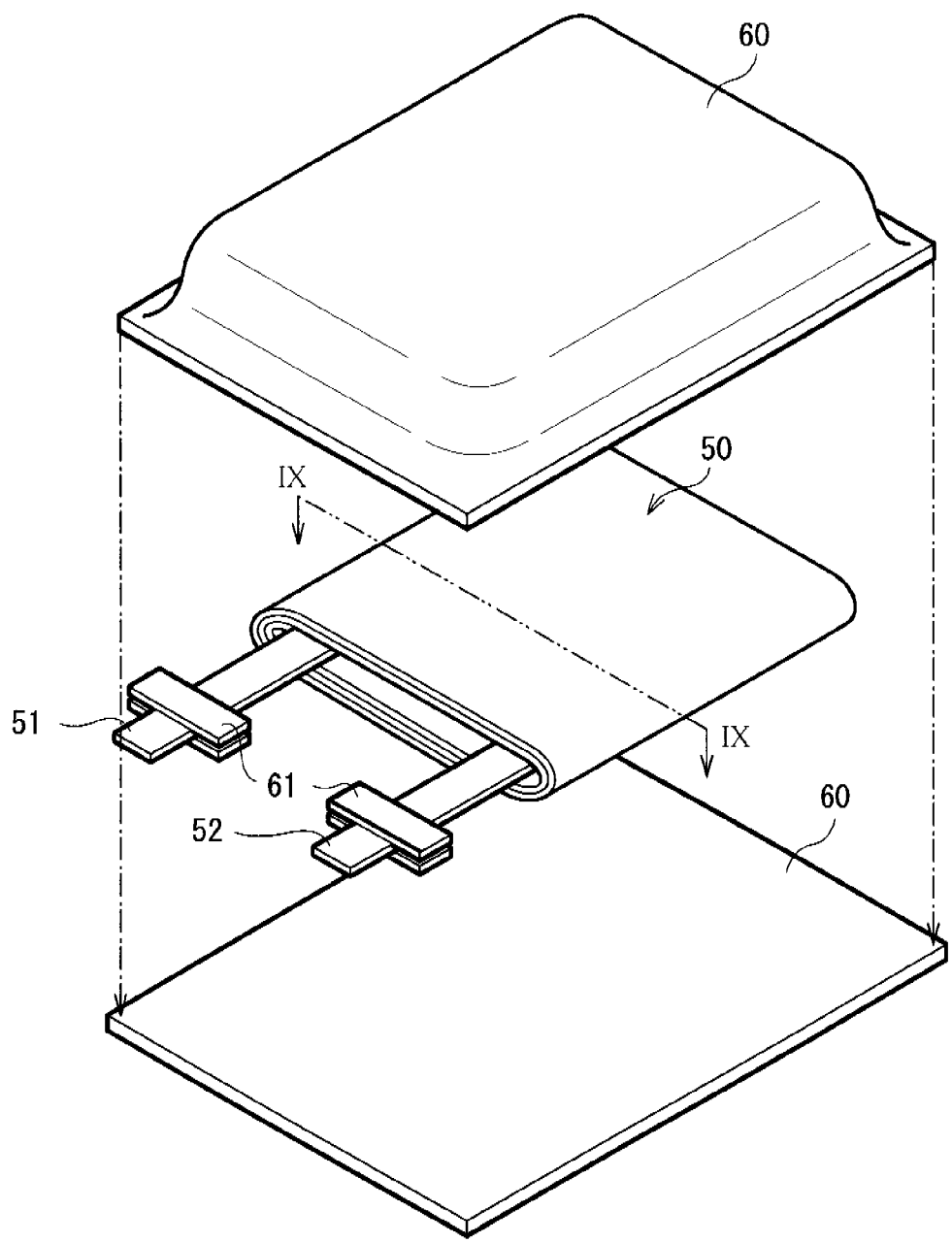
FIG. 8 is a cross section showing a structure of a third battery including the anode according to the embodiment of the invention.
Figure 9:
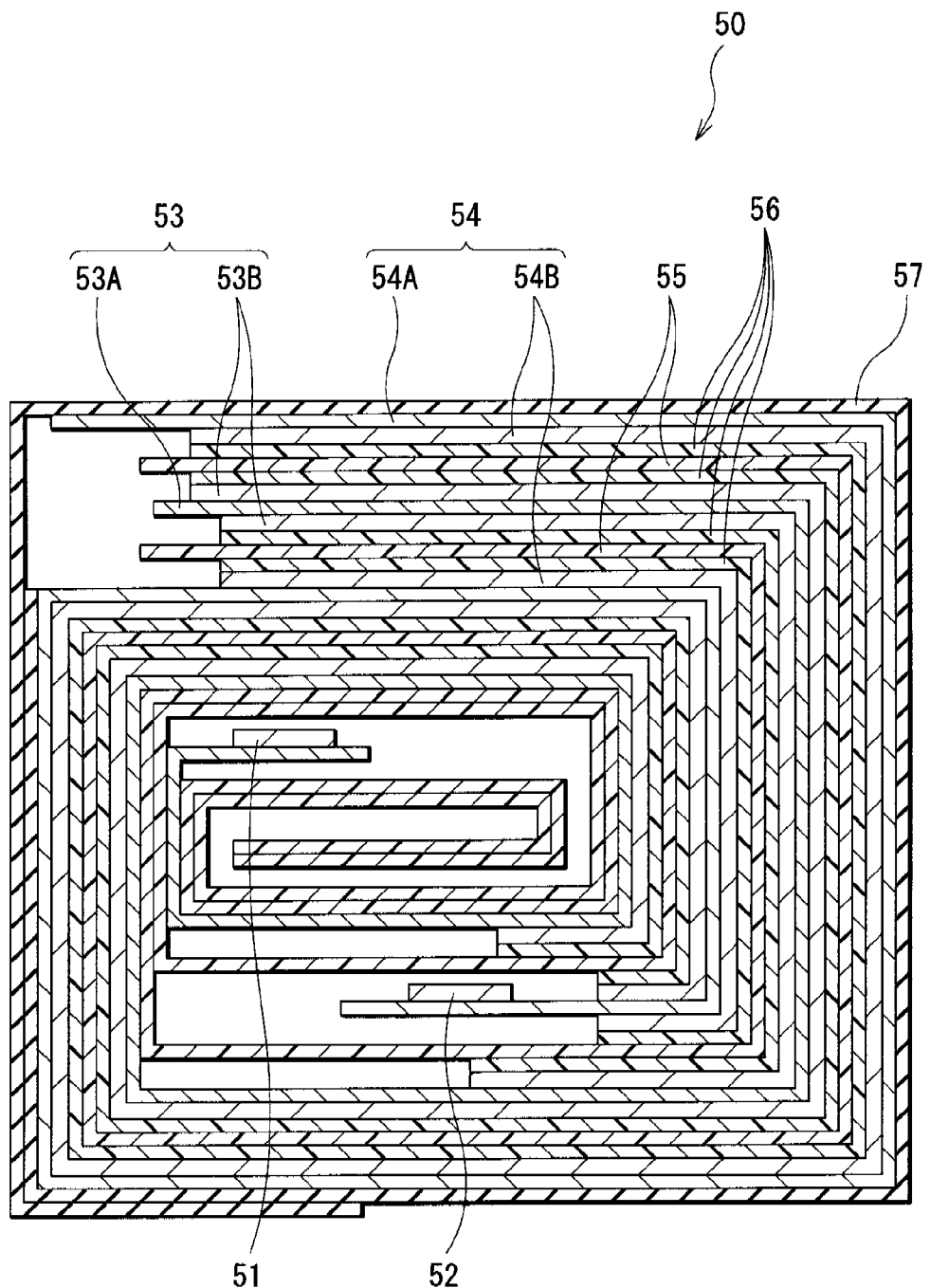
FIG. 9 is a cross section taken along line IX-IX of the spirally wound electrode body shown in FIG. 8.

FIG. 8 shows an exploded perspective structure of a third battery. FIG. 9 shows an exploded cross section taken along line IX-IX shown in FIG. 8. In the battery, a spirally wound electrode body 50 on which a cathode lead 51 and an anode lead 52 are attached is contained in a film package member 60. The battery structure including the package member 60 is a so-called laminated film structure.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. The cathode lead 51 and the anode lead 52 are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of two pieces of rectangle aluminum laminated films are bonded to each other by fusion bonding or an adhesive so that the polyethylene film and the spirally wound electrode body 50 are opposed to each other.

An adhesive film 61 to protect from the entering of outside air is inserted between the package member 60 and the cathode lead 51, the anode lead 52. The adhesive film 61 is made of a material having contact characteristics to the cathode lead 51 and the anode lead 52. Examples of such a material include, for example, a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and an anode 54 are layered with a separator 55 and an electrolyte 56 in between and then spirally wound. The outermost periphery thereof is protected by a protective tape 57.

The cathode 53 has a structure in which, for example, a cathode active material layer 53B is provided on the both faces of a cathode current collector 53A having a pair of opposed faces. The anode 54 has a structure similar to that of the foregoing anode, for example, has a structure in which an anode active material layer 54B is provided on the both faces of a strip-shaped anode current collector 54A. The structures of the cathode current collector 53A, the cathode active material layer 53B, the anode current collector 54A, the anode active material layer 54B, and the separator 55 are respectively similar to those of the cathode current collector 21A, the cathode active material layer 21B, the anode current collector 22A, the anode active material layer 22B, and the separator 23 of the foregoing first battery.

The electrolyte 56 is a so-called gel electrolyte, containing an electrolytic solution and a polymer compound that holds the electrolytic solution. The gel electrolyte is preferable, since high ion conductivity (for example, 1 mS/cm or more at room temperature) may be obtained and liquid leakage may be prevented. The electrolyte 56 is provided, for example, between the cathode 53 and the separator 55, and between the anode 54 and the separator 55.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethacrylate, polyacrylic acid, polymethacrylic acid, styrene-butadiene rubber, nitrile-butadiene rubber, polystyrene, polycarbonate or the like is cited. One of these polymer compounds may be used singly, or two or more thereof may be used by mixing. Specially, polyacrylonitrile, polyvinylidene fluoride, polyhexafluoropropylene, polyethylene oxide or the like is preferably used as the polymer compound, since thereby the electrochemical stability may be obtained.

The composition of the electrolytic solution is similar to the composition of the electrolytic solution in the first battery. However, in this case, the solvent means a wide concept including not only the liquid solvent but also a solvent having ion conductivity capable of dissociating the electrolyte salt. Therefore, when the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The battery including the gel electrolyte 56 is manufactured, for example, as follows.

First, the cathode 53 in which the cathode active material layer 53B is provided on the both faces of the cathode current collector 53A is formed and the anode 54 in which the anode active material layer 54B is provided on the both faces of the anode current collector 54A is formed by respective procedures similar to the foregoing procedures of forming the cathode 21 and the anode 22 in the foregoing first battery. Subsequently, a precursor solution containing an electrolytic solution, a polymer compound, and a solvent is prepared.

Then, the cathode 53 and the anode 54 are respectively coated with the precursor solution. After that, the solvent is volatilized to form the gel electrolyte 56. Subsequently, the cathode lead 51 is attached to the cathode current collector 53A, and the anode lead 52 is attached to the anode current collector 54A. Subsequently, the cathode 53 and the anode 54 formed with the electrolyte 56 are layered with the separator 55 in between to obtain a laminated body. After that, the laminated body is spirally wound in the longitudinal direction, the protective tape 57 is adhered to the outermost periphery thereof to form the spirally wound electrode body 50. Subsequently, for example, the spirally wound electrode body 50 is sandwiched between the package members 60, and outer edges of the package members 60 are contacted by thermal fusion bonding or the like to enclose the spirally wound electrode body 50. At this time, the adhesive film 61 is inserted between the cathode lead 51/the anode lead 52 and the package member 60. Thereby, the secondary battery shown in FIG. 8 and FIG. 9 is fabricated.

Otherwise, the foregoing battery may be manufactured as follows. First, the cathode lead 51 and the anode lead 52 are respectively attached on the cathode 53 and the anode 54. After that, the cathode 53 and the anode 54 are layered with the separator 55 in between and spirally wound. The protective tape 57 is adhered to the outermost periphery thereof, and a spirally wound body as a precursor of the spirally wound electrode body 50 is formed. Subsequently, the spirally wound body is sandwiched between the package members 60, the peripheral edges other than one side of the peripheral edges are contacted by thermal fusion-bonding or the like to obtain a pouched state, and the spirally wound body is contained in the pouched-like package member 60. Subsequently, a composition of matter for electrolyte containing the electrolytic solution, a monomer as a raw material for a polymer compound, a polymerization initiator, and if necessary other material such as a polymerization inhibitor is prepared, which is injected into the pouched-like package member 60. After that, the opening of the package member 60 is hermetically sealed by, for example, thermal fusion bonding or the like. Finally, the monomer is thermally polymerized to obtain a polymer compound. Thereby, the gel electrolyte 56 is formed. Consequently, the secondary battery shown in FIG. 8 and FIG. 9 is fabricated.

According to the laminated film secondary battery, the anode 54 has the structure similar to that of the foregoing anode. Thus, the cycle characteristics may be improved. Effects of the secondary battery other than the foregoing effects are similar to those of the first battery.

In the foregoing first to third batteries, it is possible to check whether the intensity ratio I (200)/I (111) is within the appropriate range (from 0.5 to 1.5) or not both before and after charge and discharge. More specifically, as an anode structure, in some cases the anode active material layer is provided to cover the entire surface of the anode current collector, and in the other cases the anode active material layer is provided to cover only part of the surface thereof (for example, the region opposed to the cathode active material layer). Meanwhile, as a cathode structure, it is general that the cathode active material layer is provided to cover only part of the surface of the cathode current collector. Thereby, the anode current collector includes the region opposed to the cathode active material layer and the region not opposed to the cathode active material layer. In the region opposed to the cathode active material layer, electrode reaction between the cathode active material layer and the anode active material layer proceeds, and the battery is charged and discharged. Thus, even if the intensity ratio I (200)/I (111) is set to within the appropriate range before charge and discharge, the intensity ratio I (200)/I (111) may be changed due to the effect of charge and discharge. Meanwhile, in the region not opposed to the cathode active material layer, regardless of whether or not the anode active material layer is provided in such a region, the intensity ratio I (200)/I (111) is not affected by charge and discharge, and thus the intensity ratio I (200)/I (111) before charge and discharge is not changed after charge and discharge. Therefore, when the intensity ratio I (200)/I (111) is examined in the region not opposed to the cathode active material layer, it is possible to check whether or not the intensity ratio I (200)/I (111) is within the appropriate range with good reproducibility regardless of presence of charge and discharge.

EXAMPLES

Examples of the invention will be described in detail.

Example 1-1

The laminated film secondary battery shown in FIG. 8 and FIG. 9 was fabricated by the following procedure. The secondary battery was fabricated as a lithium ion secondary battery in which the capacity of the anode 54 was expressed based on insertion and extraction of lithium.

First, the cathode 53 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by weight of the lithium cobalt complex oxide as a cathode active material, 6 parts by weight of graphite as an electrical conductor, and 3 parts by weight of polyvinylidene fluoride as a binder were mixed to obtain a cathode mixture. After that, the cathode mixture was dispersed in N-methyl-2-pyrrolidone to obtain paste cathode mixture slurry. Finally, the both faces of the cathode current collector 53A made of a strip-shaped aluminum foil having a thickness of 12 μm were uniformly coated with the cathode mixture slurry, which was dried. After that, the resultant was compression-molded by a roll pressing machine to form the cathode active material layer 53B. After that, the cathode lead 51 made of aluminum was welded to one end of the cathode current collector 53A.

Next, the anode 54 was formed. First, a copper foil having a thickness of 18 μm was prepared as an original foil. After that, the original foil was annealed. The annealing temperature of the original foil was 300 deg C., and the maximum value of the cross-section area of the copper crystallite was 50 μm$^2$. The cross-section area of the crystallite was measured by exposing a cross section of the original foil with the use of a cross section polisher, and then observing the cross section with the use of a low-accelerated voltage SEM. Subsequently, the anode current collector 54A made of an electrolytic copper foil was prepared by providing electrolytic treatment for the surface of the original foil to form fine particles and a plated film. The ten point height roughness profile Rz of the surface of the anode current collector 54A was 3.5 μm. For the ten point height roughness profile Rz, with the use of sensing pin type profilometer Dektak 3 (manufactured by Ulvac Equipment Sales, Inc.), pin scanning was performed in the direction perpendicular to the spirally wound direction of the anode current collector 54A in a subsequent step, and thereby the average value of measured values that were randomly selected was obtained. When the extension coefficient and the Young's modulus of the anode current collector 54A were measured, the extension coefficient was 9% and the Young's modulus was 5.93×10⁷ MPa. Subsequently, silicon was deposited on the both faces of the anode current collector 54A by electron beam evaporation method using a deflecting electron beam evaporation source while continuously introducing oxygen gas into a chamber and if necessary introducing moisture vapor into the chamber, so that the anode active particle had a single layer structure. Thereby, the anode active material layer 54B was formed. Silicon with the purity of 99% was used as the evaporation source, the deposition rate was 10 nm/sec, and the oxygen content in the anode active material particle was 3 atomic %. Finally, the anode current collector 54A formed with the anode active material layer 54B was annealed under the reduced pressure atmosphere of $10^{-3}$ Pa or less. The annealing temperature of the anode current collector 54A was 150 deg C., and the intensity ratio I (200)/I (111) between the intensities of the peaks originated in the copper crystal planes obtained by X-ray diffraction was set to 0.5. The intensity ratio I (200)/I (111) was measured as follows. The formed anode 54 was cut into a piece being 5 mm×5 mm in size. After that, measurement was performed by analysis with the use of an XRD diffracting device (manufactured by Rigaku Co., Ltd.). CuKα was used as a tube, θ-2θ method was used as a scanning method, the X-ray tube voltage was 40 kV, the tube current was 40 mA, and the measurement range was in the range from 40 degree to 100 degree.

For the formed anode 54, a cross section was exposed by focused ion beam etching (FIB), and then local element analysis was performed by auger electron spectrometer (AES). In the result, it was confirmed that the element of the anode current collector 54A and the element of the anode active material layer 54B were diffused into each other at the interface between the anode current collector 54A and the anode active material layer 54B, and the both elements are alloyed.

Next, the cathode 53, a three-layer polymer separator 55 (thickness: 23 μm) in which a porous polyethylene film was sandwiched between porous polypropylene films, the anode 54, and the foregoing polymer separator 55 were layered in this order. The resultant laminated body was spirally wound in the longitudinal direction, the end section of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a three-layer laminated film (total thickness: 100 μm) in which nylon (thickness: 30 μm), aluminum (thickness: 40 μm), and non-stretched polypropylene (thickness: 30 μm) were layered from the outside. After that, outer edges other than an edge of one side of the package members 60 were thermally fusion-bonded to each other. Thereby, the spirally wound body was contained in the package members 60 in a pouched state. Subsequently, an electrolytic solution was injected through the opening of the package member 60, the electrolytic solution was impregnated in the separator 55, and thereby the spirally wound electrode body 50 was formed.

When preparing the electrolytic solution, a mixed solvent of ethylene carbonate (EC) and diethyl carbonate (DEC) as a solvent was used, and lithium hexafluorophosphate ($LiPF_6$) was used as an electrolyte salt. The composition of the mixed solvent (EC:DEC) was 50:50 at a weight ratio. The concentration of the electrolyte salt was 1 mol/kg.

Finally, the opening of the package member 60 was thermally fusion bonded and sealed in the vacuum atmosphere. Thereby, the laminated film secondary battery was fabricated.

Examples 1-2 to 1-7

A procedure was performed in the same manner as that of Example 1-1, except that the intensity ratio I (200)/I (111) was changed to 0.8 (200 deg C.: Example 1-2), 1 (250 deg C.: Example 1-3), 1.15 (300 deg C.: Example 1-4), 1.2 (350 deg C.: Example 1-6), 1.4 (400 deg C.: Example 1-6), or 1.5 (450 deg C.: Example 1-7), instead of 0.5. The temperatures shown in parentheses are annealing temperatures of the anode current collector 54A set to obtain the foregoing respective values of the intensity ratio I (200)/I (111).

Comparative Examples 1-1 to 1-6

A procedure was performed in the same manner as that of Example 1-1, except that the intensity ratio I (200)/I (111) was changed to 0.1 (25 deg C.: Comparative example 1-1), 0.3 (100 deg C.: Comparative example 1-2), 1.6 (500 deg C.: Comparative example 1-3), 1.8 (525 deg C.: Comparative example 1-4), 2 (550 deg C.: Comparative example 1-6), or 2.5 (575 deg C.: Comparative example 1-6), instead of 0.5.

Figure 10:
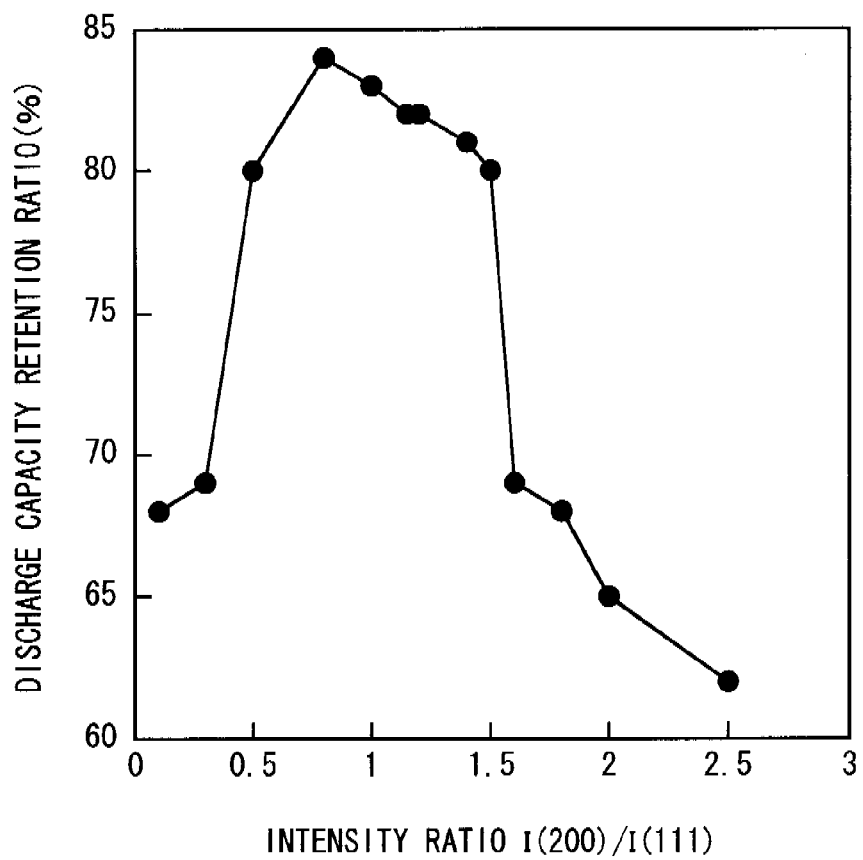
FIG. 10 is a diagram showing a correlation between an intensity ratio and a discharge capacity retention ratio.

When the cycle characteristics of the secondary batteries of Examples 1-1 to 1-7 and Comparative examples 1-1 to 1-6 were examined, the results shown in Table 1 and FIG. 10 were obtained. In Table 1, the maximum value is shown as a cross section of the crystallite. The same is similarly applied to the following tables.

In examining the cycle characteristics, a cycle test was performed by the following procedure, and thereby the discharge capacity retention ratio was obtained. First, to stabilize the battery state, after charge and discharge were performed 1 cycle in the atmosphere at 23 deg C., charge and discharge were performed again. Thereby, the discharge capacity at the second cycle was measured. Subsequently, the secondary battery was charged and discharged 99 cycles in the same atmosphere, and thereby the discharge capacity at the 101st cycle was measured. Finally, the discharge capacity retention ratio (%)=(discharge capacity at the 101st cycle/discharge capacity at the second cycle)×100 was calculated. The charge condition was as follows. That is, after charge was performed at the constant current density of 3 mA/cm² until the battery voltage reached 4.2 V, charge was continuously performed at the constant voltage of 4.2 V until the battery density reached 0.3 mA/cm². The discharge conditions were as follows. That is, discharge was performed at the constant current density of 3 mA/cm² until the battery voltage reached 2.5 V. The procedure and the conditions for examining the cycle characteristics are similarly applied to the following examples and comparative examples.

TABLE 1

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | |
|---|---|---|---|---|
| | Number of anode active material particle layers (layer) | Intensity ratio I (200)/I (111) | Cross-section area of crystallite (μm²) | Discharge capacity retention ratio (%) |
| Example 1-1 | 1 | 0.5 | 50 | 80 |
| Example 1-2 | | 0.8 | | 84 |
| Example 1-3 | | 1 | | 83 |
| Example 1-4 | | 1.15 | | 82 |
| Example 1-5 | | 1.2 | | 82 |
| Example 1-6 | | 1.4 | | 81 |
| Example 1-7 | | 1.5 | | 80 |
| Comparative example 1-1 | 1 | 0.1 | 50 | 68 |

TABLE 1-continued

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | |
|---|---|---|---|---|
| | Number of anode active material particle layers (layer) | Intensity ratio I (200)/I (111) | Cross-section area of crystallite (μm²) | Discharge capacity retention ratio (%) |
| Comparative example 1-2 | | 0.3 | | 69 |
| Comparative example 1-3 | | 1.6 | | 69 |
| Comparative example 1-4 | | 1.8 | | 68 |
| Comparative example 1-5 | | 2 | | 65 |
| Comparative example 1-6 | | 2.5 | | 62 |

As shown in Table 1 and FIG. 10, in Examples 1-1 to 1-7 in which the intensity ratio I (200)/I (111) was in the range from 0.5 to 1.5, the discharge capacity retention ratio was largely higher than those of Comparative examples 1-1 to 1-6 in which the intensity ratio I (200)/I (111) was out of the range. That is, the discharge capacity retention ratio was changed in an upward convex curve as the intensity ratio I (200)/I (111) was increased. In particular, when the intensity ratio I (200)/I (111) was smaller than 0.5 or larger than 1.5, the discharge capacity retention ratio was extremely lowered. Accordingly, it was confirmed that in the secondary battery of the invention, the cycle characteristics were improved in the case where the intensity ratio I (200)/I (111) was in the range from 0.5 to 1.5.

Figure 11A:
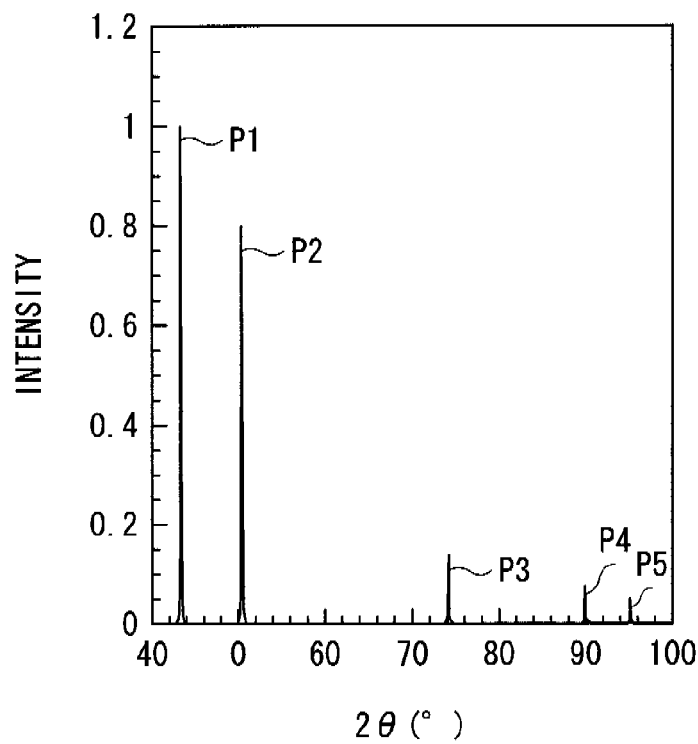
FIGS. 11A and 11B are XRD analysis results of anodes (Examples 1-2 and 1-4)
Figure 11B:
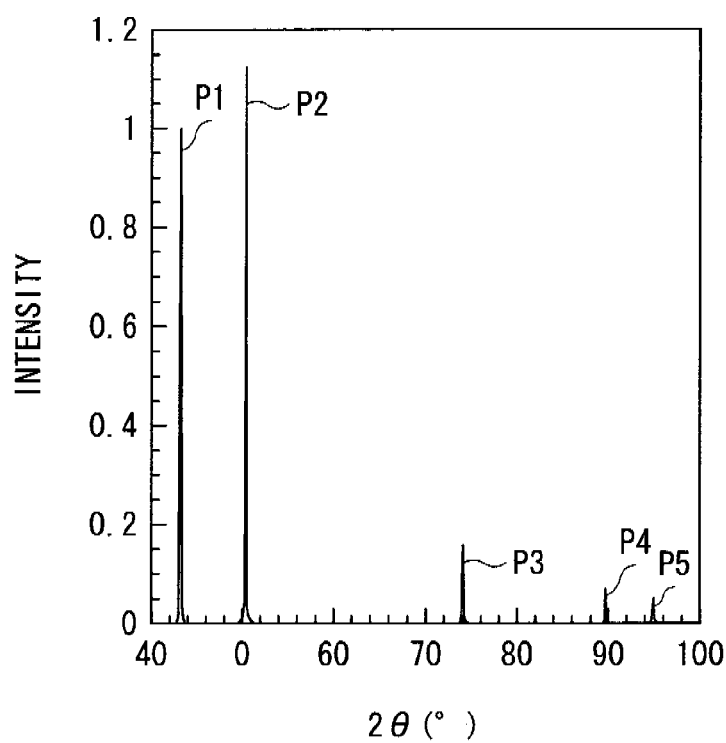

As a representative of Examples 1-1 to 1-7 described above, when the anodes 54 used for the secondary batteries of Examples 1-2 and 1-4 were analyzed by an XRD device, the results shown in FIGS. 11A and 11B were obtained. FIG. 11A and FIG. 11B respectively show Examples 1-2 and 1-4. The horizontal axis and the vertical axis respectively show 2θ (degree) and a normalized X-ray intensity. As shown in FIGS. 11A and 11B, in both Examples 1-2 and 1-4, five peaks identifying the copper crystal condition were confirmed. The five peaks include peak P1 originated in (111) crystal plane, peak P2 originated in (200) crystal plane, peak 3 originated in (220) crystal plane, peak P4 originated in (311) crystal plane, and peak P5 originated in (222) crystal plane. When the intensities of the peaks P1 to P5 were compared to each other, the intensities of the peaks P1 and P2 were significantly larger than those of the peaks P3 to P5. In this case, in Example 1-2, as shown in FIG. 11A, the intensity of peak P2 was smaller than that of peak P1. Thus, the intensity ratio I (200)/I (111) was smaller than 1. Meanwhile, in Example 1-4, as shown in FIG. 11B, the intensity of peak P2 was larger than that of peak P1. Thus, the intensity ratio I (200)/I (111) was larger than 1. Accordingly, it was confirmed that in the secondary battery of the invention, the intensities of the two peaks originated in (111) crystal plane and (200) crystal plane were sufficiently larger than the intensities of the other peaks, and therefore the copper crystal state was determined with a good reproducibility based on the intensity ratio of the two peaks, and the cycle characteristics were changed according to the intensity ratio.

Though a specific analytical result is not herein shown, when Comparative examples 1-3 to 1-6 in which the intensity ratio I (200)/I (111) was larger than 1.5 were analyzed by the XRD device, a peak showing existence of $Cu_3Si$ was confirmed. Such a result showed that element diffusion excessively proceeded at the interface between the anode current collector 54A (Cu) and the anode active material particle (Si), and thus $Cu_3Si$ was generated at the interface thereof. In the result, in Comparative examples 1-3 to 1-6, the contact characteristics between the anode current collector 54A and the anode active material particle were lowered, and thus sufficient cycle characteristics were not obtained.

Examples 2-1 to 2-6

A procedure was performed in the same manner as that of Examples 1-1 to 1-3 and Examples 1-5 to 1-7, except that the anode active material particle was formed into six-layer structure by depositing silicon six times. The deposition rate was 100 nm/sec.

Comparative Examples 2-1 to 2-3

A procedure was performed in the same manner as that of Comparative examples 1-2 to 1-4, except that the anode active material particle was formed into six-layer structure as in Examples 2-1 to 2-6.

Figure 12:
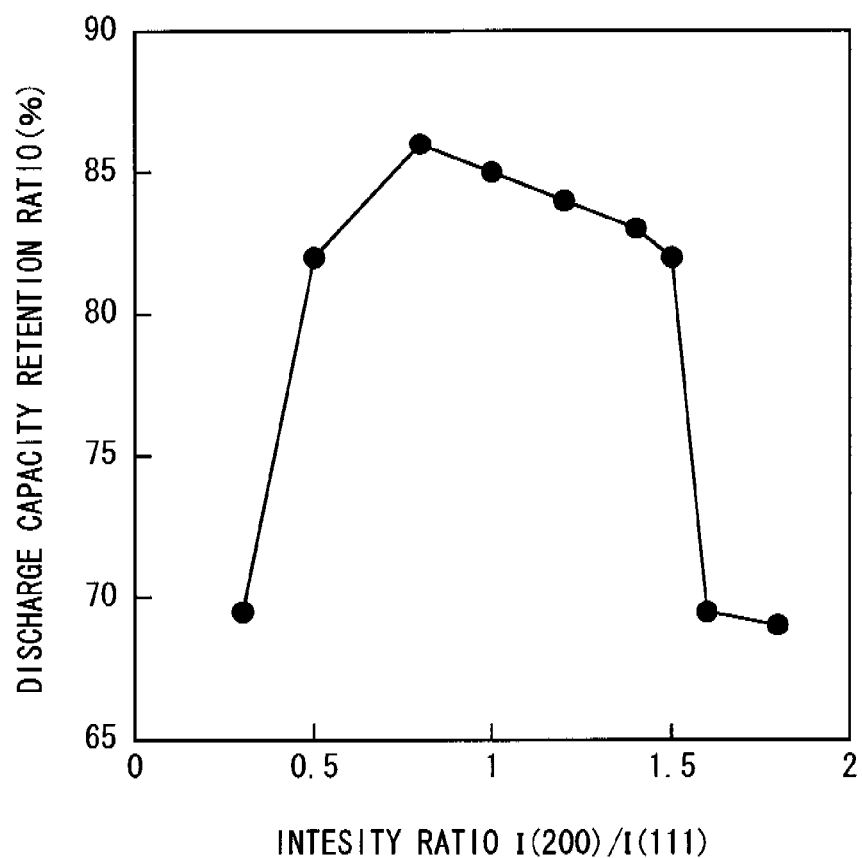
FIG. 12 is a diagram showing another correlation between an intensity ratio and a discharge capacity retention ratio.

When the cycle characteristics of the secondary batteries of Examples 2-1 to 2-6 and Comparative examples 2-1 to 2-3 were examined, the results shown in Table 2 and FIG. 12 were obtained.

TABLE 2

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | |
|---|---|---|---|---|
| | Number of anode active material particle layers (layer) | Intensity ratio I (200)/I (111) | Cross-section area of crystallite (μm²) | Discharge capacity retention ratio (%) |
| Example 2-1 | 6 | 0.5 | 50 | 82 |
| Example 2-2 | | 0.8 | | 86 |
| Example 2-3 | | 1 | | 85 |
| Example 2-4 | | 1.2 | | 84 |
| Example 2-5 | | 1.4 | | 83 |
| Example 2-6 | | 1.5 | | 82 |
| Comparative example 2-1 | 6 | 0.3 | 50 | 69.5 |
| Comparative example 2-2 | | 1.6 | | 69.5 |
| Comparative example 2-3 | | 1.8 | | 69 |

As shown in Table 2 and FIG. 12, in Examples 2-1 to 2-6 in which the intensity ratio I (200)/I (111) was in the range from 0.5 to 1.5, the discharge capacity retention ratio was largely higher than those of Comparative examples 2-1 to 2-3 in which the intensity ratio I (200)/I (111) was out of the range. Accordingly, it was confirmed that in the secondary battery of the invention, in the case where the number of the anode active material particle layers was six, the cycle characteristics were improved as well.

Examples 3-1 to 3-6

A procedure was performed in the same manner as that of Examples 1-1 to 1-3 and Examples 1-5 to 1-7, except that the anode active material particle was formed into 12-layer structure by depositing silicon 12 times.

Comparative Examples 3-1 to 3-3

A procedure was performed in the same manner as that of Comparative examples 1-2 to 1-4, except that the anode active material particle was formed into 12-layer structure as in Examples 3-1 to 3-6.

Figure 13:
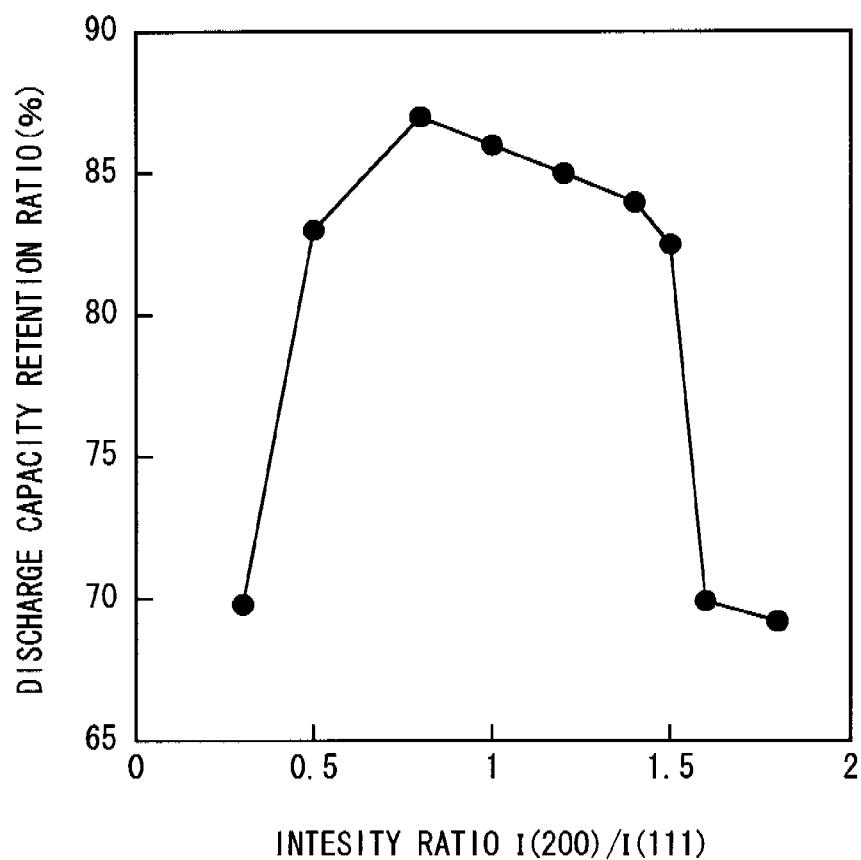
FIG. 13 is a diagram showing still another correlation between an intensity ratio and a discharge capacity retention ratio.

When the cycle characteristics of the secondary batteries of Examples 3-1 to 3-6 and Comparative examples 3-1 to 3-3 were examined, the results shown in Table 3 and FIG. 13 were obtained.

TABLE 3

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | |
|---|---|---|---|---|
| | Number of anode active material particle layers (layer) | Intensity ratio I (200)/I (111) | Cross-section area of crystallite (μm$^2$) | Discharge capacity retention ratio (%) |
| Example 3-1 | 12 | 0.5 | 50 | 83 |
| Example 3-2 | | 0.8 | | 87 |
| Example 3-3 | | 1 | | 86 |
| Example 3-4 | | 1.2 | | 85 |
| Example 3-5 | | 1.4 | | 84 |
| Example 3-6 | | 1.5 | | 82.5 |
| Comparative example 3-1 | 12 | 0.3 | 50 | 69.8 |
| Comparative example 3-2 | | 1.6 | | 69.9 |
| Comparative example 3-3 | | 1.8 | | 69.2 |

As shown in Table 3 and FIG. 13, in Examples 3-1 to 3-6 in which the intensity ratio I (200)/I (111) was in the range from 0.5 to 1.5, the discharge capacity retention ratio was largely higher than those of Comparative examples 3-1 to 3-3 in which the intensity ratio I (200)/I (111) was out of the range. Accordingly, it was confirmed that in the secondary battery of the invention, in the case where the number of the anode active material particle layers was 12, the cycle characteristics were improved as well.

From the results shown in Table 1 to Table 3, it was confirmed that in the secondary battery of the invention, the cycle characteristics were improved when the intensity ratio I (200)/I (111) was in the range from 0.5 to 1.5, both in the case that the anode active material particle is formed into the single layer structure and in the case that the anode active material particle is formed into the multilayer structure. In this case, in particular, as evidenced by the result obtained by comparison among Examples 1-1, 2-1, 3-1 and the like under the same conditions except for the number of the anode active material particle, layers as the number of layers was larger, the discharge capacity retention ratio tended to be higher. Accordingly, it was confirmed that in the case that the anode active material particle was formed into the multilayer structure, when the number of layers was increased, higher effects were obtained.

Examples 4-1 to 4-9

A procedure was performed in the same manner as that of Example 2-2, except that the maximum value of the cross-section area of the copper crystallite was changed to 4 μm$^2$ (25 deg C.: Example 4-1), 10 μm$^2$ (100 deg C.: Example 4-2), 20 μm$^2$ (160 deg C.: Example 4-3), 30 μm$^2$ (200 deg C.: Example 4-4), 40 μm$^2$ (250 deg C.: Example 4-5), 70 μm$^2$ (350 deg C.: Example 4-6), 85 μm$^2$ (400 deg C.: Example 4-7), 100 μm$^2$ (450 deg C.: Example 4-8), or 120 μm$^2$ (500 deg C.: Example 4-9), instead of 50 μm$^2$. The temperatures shown in parentheses are annealing temperatures of the original foil set to obtain the foregoing respective values of the cross-section areas of the crystallite.

Figure 14:
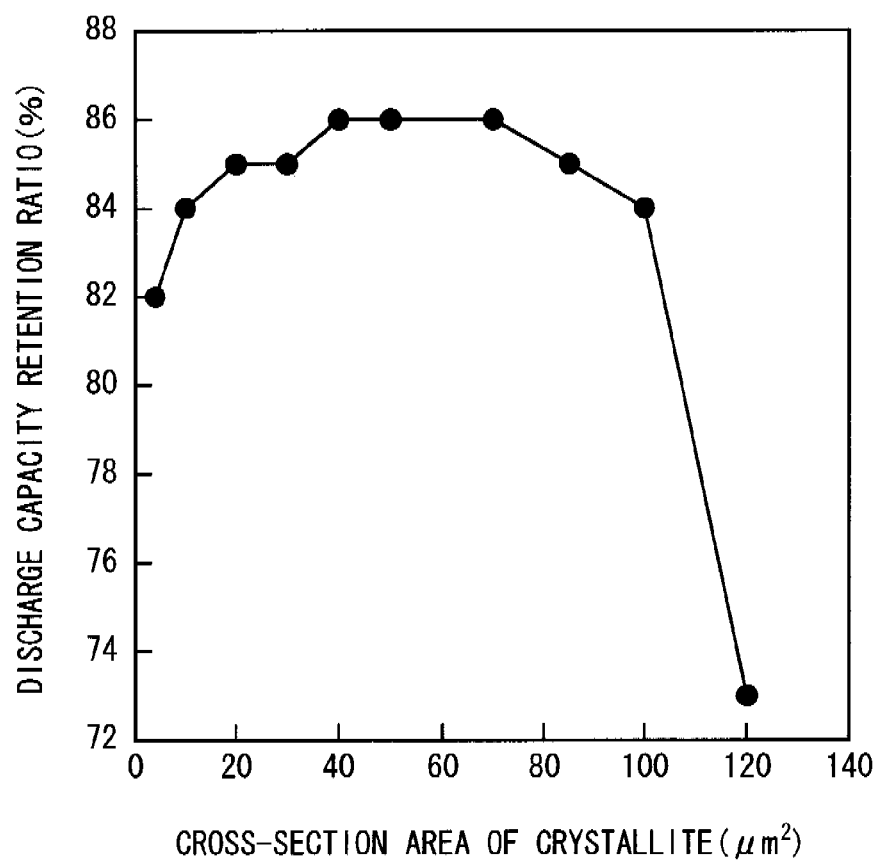
FIG. 14 is a diagram showing a correlation between a cross-section area of a crystallite and a discharge capacity retention ratio.

When the cycle characteristics of the secondary batteries of Examples 4-1 to 4-9 were examined, the results shown in Table 4 and FIG. 14 were obtained. In Table 4, the results of Example 2-2 and Comparative examples 2-1 to 2-3 are shown together.

TABLE 4

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | |
|---|---|---|---|---|
| | Number of anode active material particle layers (layer) | Intensity ratio I (200)/I (111) | Cross-section area of crystallite (μm$^2$) | Discharge capacity retention ratio (%) |
| Example 4-1 | 6 | 0.8 | 4 | 82 |
| Example 4-2 | | | 10 | 84 |
| Example 4-3 | | | 20 | 85 |
| Example 4-4 | | | 30 | 85 |
| Example 4-5 | | | 40 | 86 |
| Example 2-2 | | | 50 | 86 |
| Example 4-6 | | | 70 | 86 |
| Example 4-7 | | | 85 | 85 |
| Example 4-8 | | | 100 | 84 |
| Example 4-9 | | | 120 | 73 |
| Comparative example 2-1 | 6 | 0.3 | 50 | 69.5 |
| Comparative example 2-2 | | 1.6 | | 69.5 |
| Comparative example 2-3 | | 1.8 | | 69 |

As shown in Table 4 and FIG. 14, in Examples 2-2 and 4-1 to 4-9 in which the intensity ratio I (200)/I (111) was in the range from 0.5 to 1.5, the discharge capacity retention ratio was largely higher than those of Comparative examples 2-1 to 2-3 even in the case where the cross-section area of the crystallite was changed. In this case, the discharge capacity retention ratio was changed in an upward convex curve as the cross-section area of the crystallite was increased. In particular, when the cross-section area was larger than 100 μm$^2$, the discharge capacity retention ratio tended to be extremely lowered. Accordingly, it was confirmed that in the secondary battery of the invention, the cycle characteristics were improved not depending on the cross-section area of the copper crystallite. Further, it was confirmed that when the cross-section area was 100 μm$^2$ or less, higher effects were obtained.

Figure 15A:
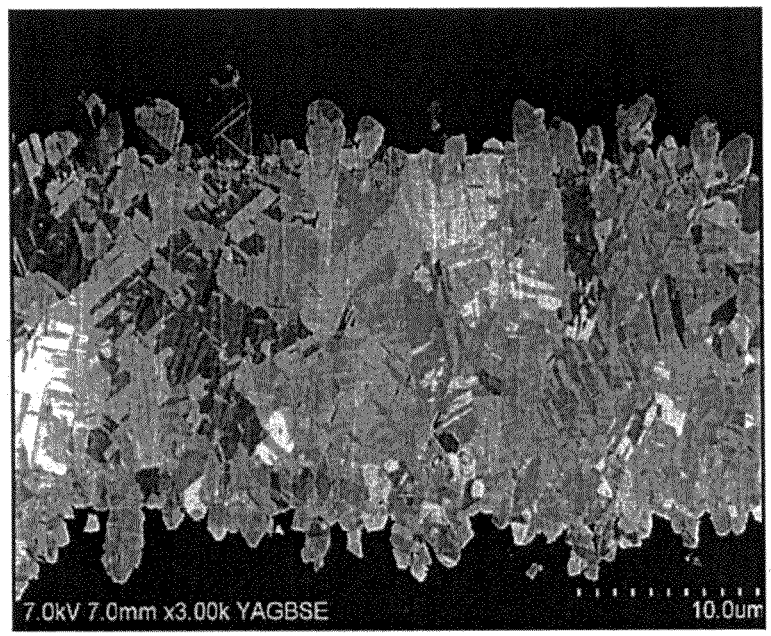
FIGS. 15A and 15B are SEM photographs showing cross sectional structures of anode current collectors (Examples 2-2 and 4-1)
Figure 15B:
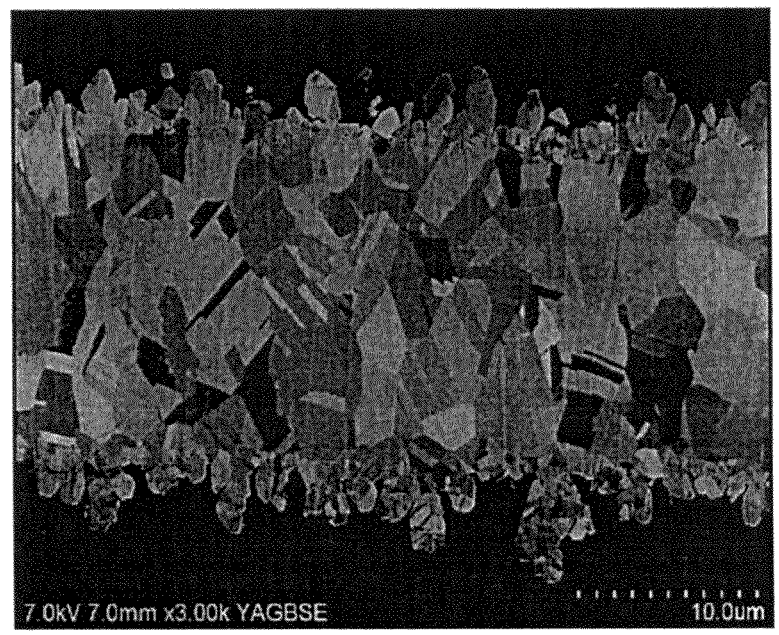

As a representative of Examples 2-2 and 4-1 to 4-9 described above, when cross sections of the anode current collectors 54 used for the secondary batteries of Examples 2-2 and 4-1 were observed by a field emission (FE) SEM, the results shown in FIGS. 15A and 15B were obtained. FIG. 15A and FIG. 15B are SEM photographs showing the cross sectional structures of the anode current collector 54A. FIG. 15A and FIG. 15B respectively show observation results of Examples 4-1 and 2-2. As shown in FIGS. 15A and 15B, in both Examples 2-2 and 4-1, a plurality of copper crystallites were observed. That is, when matching the schematic drawing of FIG. 2 with the SEM photographs of FIGS. 15A and 15B, in the electrolytic copper foil composing the anode current collector 64A, a larger crystallite composing the original foil 1A was observed in the center, and a smaller crystallite composing the fine particle 1B and the plated film 1C was observed in the upper side and the lower side to sandwich the larger crystallite. In this case, when the crystallite area composing the original foil of Example 2-2 was compared to that of Example 4-1, there was a large difference. That is, in Example 4-1, as shown in FIG. 16A, the crystallite area was small. Meanwhile, in Example 2-2, as shown in FIG. 15B, the crystallite area was large. Accordingly, in the secondary battery of the invention, it was confirmed that the cycle characteristics were changed according to the cross-section area of the copper crystallite composing the anode current collector 54A.

Examples 5-1 to 5-6

A procedure was performed in the same manner as that of Example 2-2, except that the ten point height of roughness profile Rz of the surface of the anode current collector 54A was changed to 1 μm (Example 6-1), 1.5 μm (Example 5-2), 2.5 μm (Example 5-3), 4.5 μm (Example 5-4), 5.5 μm (Example 5-5), or 6.5 μm (Example 5-6), instead of 3.5 μm. The ten point height of roughness profile Rz was changed by adjusting electrolytic conditions using plating bath such as the current ratio, the bath temperature, the treatment times, and the bath composition.

Figure 16:
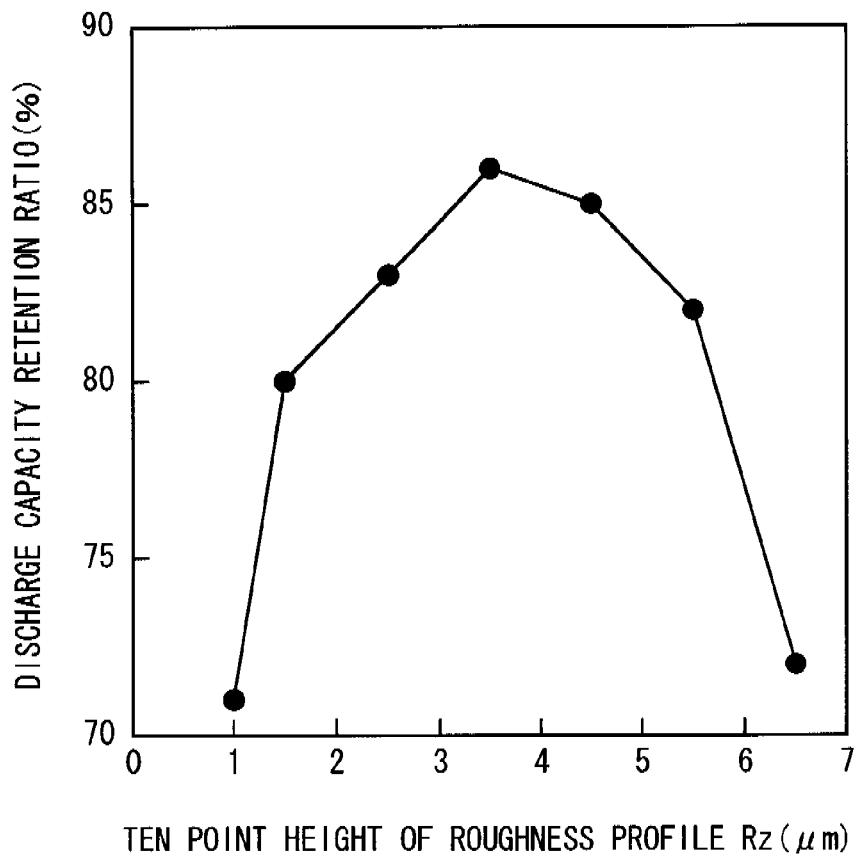
FIG. 16 is a diagram showing a correlation between ten point height of roughness profile Rz and a discharge capacity retention ratio.

When the cycle characteristics of the secondary batteries of Examples 5-1 to 5-6 were examined, the results shown in Table 5 and FIG. 16 were obtained. In Table 5, the results of Example 2-2 and Comparative examples 2-1 to 2-3 were shown together.

TABLE 5

Anode active material particle: silicon (electron beam evaporation method)
Thickness of original foil = 18 μm
Oxygen content in the anode active material particle = 3 atomic %

| | Anode active material layer Number of anode active material particle layers (layer) | Anode current collector | | | Discharge capacity retention ratio (%) |
| --- | --- | --- | --- | --- | --- |
| | | Intensity ratio I (200)/I (111) | Cross-section area of crystallite (μm$^2$) | Ten point height of roughness profile Rz (μm) | |
| Example 5-1 | 6 | 0.8 | 50 | 1 | 71 |
| Example 5-2 | | | | 1.5 | 80 |
| Example 5-3 | | | | 2.5 | 83 |
| Example 2-2 | | | | 3.5 | 86 |
| Example 5-4 | | | | 4.5 | 85 |
| Example 5-5 | | | | 5.5 | 82 |
| Example 5-6 | | | | 6.5 | 72 |
| Comparative example 2-1 | 6 | 0.3 | 50 | 3.5 | 69.5 |
| Comparative example 2-2 | | 1.6 | | | 69.5 |
| Comparative example 2-3 | | 1.8 | | | 69 |

As shown in Table 5 and FIG. 16, in Examples 2-2 and 5-1 to 5-6 in which the intensity ratio I (200)/I (111) was in the range from 0.5 to 1.5, the discharge capacity retention ratio was higher than those of Comparative examples 2-1 to 2-3 as well when the ten point height of roughness profile Rz was changed. In this case, the discharge capacity retention ratio was changed in an upward convex curve as the ten point height of roughness profile Rz was increased. In particular, when the ten point height of roughness profile Rz was smaller than 1.5 μm or larger than 5.5 μm, the discharge capacity retention ratio tended to be extremely lowered. Accordingly, it was confirmed that in the secondary battery of the invention, the cycle characteristics were improved not depending on the ten point height of roughness profile Rz of the surface of the anode current collector 54A. Further, it was confirmed that when the ten point height of roughness profile Rz was in the range from 1.5 μm to 5.5 μm, higher effects were obtained.

Examples 6-1 to 6-4

A procedure was performed in the same manner as that of Example 2-2, except that the thickness of the original foil was changed to 7 μm (Example 6-1), 10 μm (Example 6-2), 25 μm (Example 6-3), or 30 μm (Example 6-4), instead of 18 μm.

Figure 17:
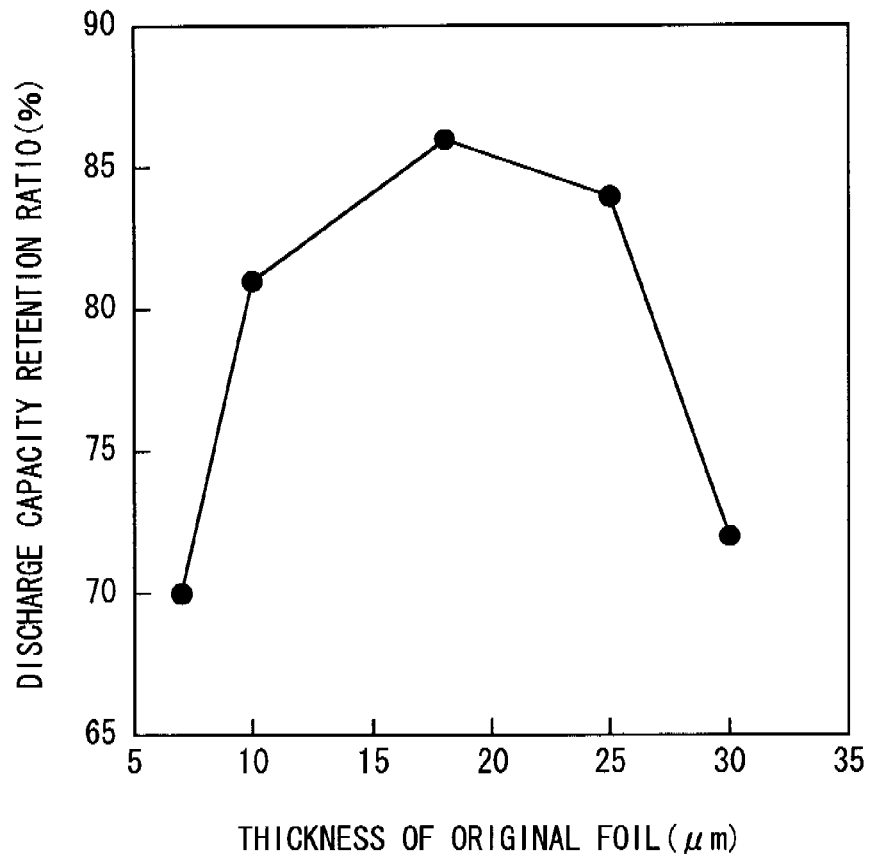
FIG. 17 is a diagram showing a correlation between a thickness of an original foil and a discharge capacity retention ratio.

When the cycle characteristics of the secondary batteries of Examples 6-1 to 6-4 were examined, the results shown in Table 6 and FIG. 17 were obtained. In Table 6, the results of Example 2-2 and Comparative examples 2-1 to 2-3 were shown together.

TABLE 6

Anode active material particle: silicon (electron beam evaporation method)
Ten point height of roughness profile Rz = 3.5 μm
Oxygen content in the anode active material particle = 3 atomic %

| | Anode active material layer | Anode current collector | | | Discharge capacity retention ratio (%) |
|---|---|---|---|---|---|
| | Number of anode active material particle layers (layer) | Intensity ratio I (200)/I (111) | Cross-section area of crystallite (μm²) | Thickness of original foil (μm) | |
| Example 6-1 | 6 | 0.8 | 50 | 7 | 70 |
| Example 6-2 | | | | 10 | 81 |
| Example 2-2 | | | | 18 | 86 |
| Example 6-3 | | | | 25 | 84 |
| Example 6-4 | | | | 30 | 72 |
| Comparative example 2-1 | 6 | 0.3 | 50 | 18 | 69.5 |
| Comparative example 2-2 | | 1.6 | | | 69.5 |
| Comparative example 2-3 | | 1.8 | | | 69 |

As shown in Table 6 and FIG. 17, in Examples 2-2 and 6-1 to 6-4 in which the intensity ratio I (200)/I (111) was in the range from 0.5 to 1.5, the discharge capacity retention ratio was higher than those of Comparative examples 2-1 to 2-3 as well when the thickness of the original foil was changed. In this case, the discharge capacity retention ratio was changed in an upward convex curve as the thickness of the original foil was increased. In particular, when the thickness of the original foil was smaller than 10 μm or larger than 25 μm, the discharge capacity retention ratio tended to be extremely lowered. Accordingly, it was confirmed that in the secondary battery of the invention, the cycle characteristics were improved not depending on the thickness of the original foil. Further, it was confirmed that if the thickness of the original foil was in the range from 10 μm to 25 μm, higher effects were obtained.

Examples 7-1 to 7-7

A procedure was performed in the same manner as that of Example 2-2, except that the extension coefficient and the Young's modulus of the anode current collector 54A were changed. In this case, the extension coefficient and the Young's modulus were respectively 0.7% and $6.53 \times 10^9$ MPa (Example 7-1), 1% and $5.00 \times 10^9$ MPa (Example 7-2), 3.2% and $4.01 \times 10^9$ MPa (Example 7-3), 4.9% and $6.32 \times 10^8$ MPa (Example 7-4), 10% and $5.00 \times 10^7$ MPa (Example 7-5), 10.5% and $3.61 \times 10^6$ MPa (Example 7-6), or 11.5% and $1.61 \times 10^6$ MPa (Example 7-7).

Figure 18:
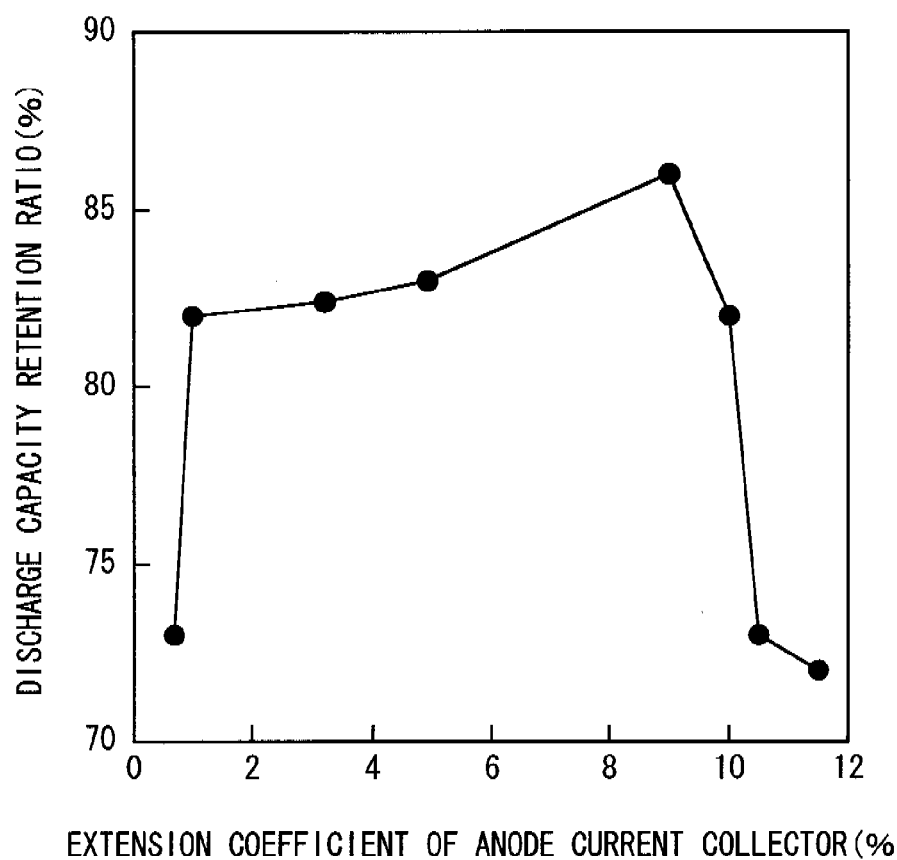
FIG. 18 is a diagram showing a correlation between an extension coefficient of an anode current collector and a discharge capacity retention ratio.
Figure 19:
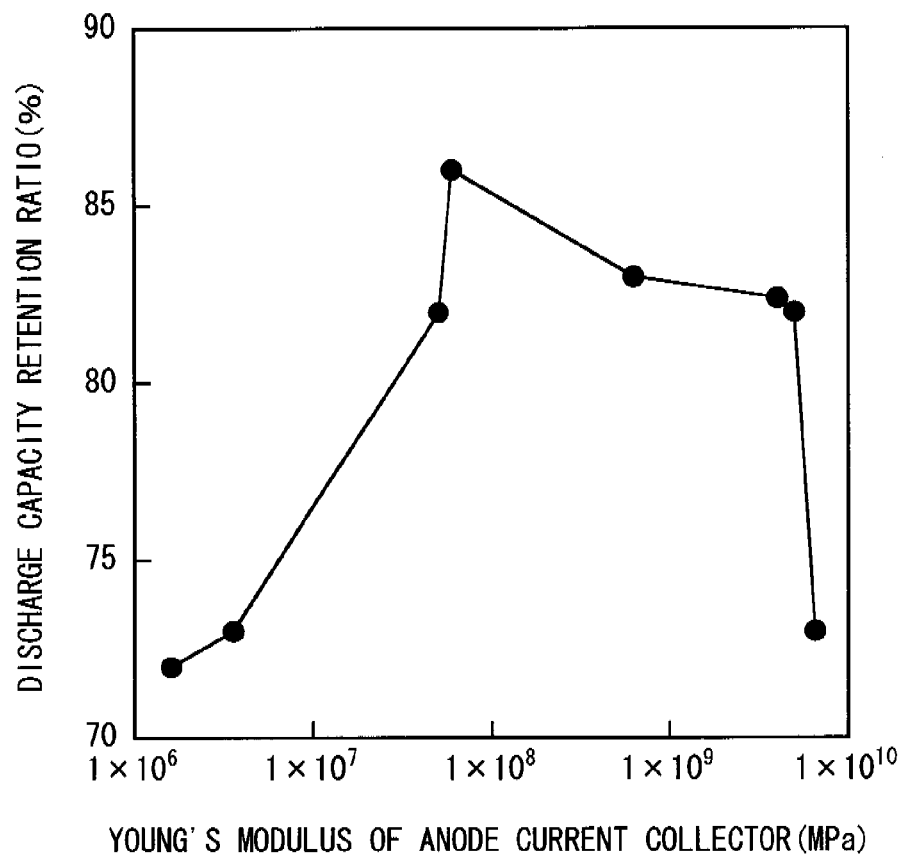
FIG. 19 is a diagram showing a correlation between a Young's modulus of an anode current collector and a discharge capacity retention ratio.

When the cycle characteristics of the secondary batteries of Examples 7-1 to 7-7 were examined, the results shown in Table 7 and FIGS. 18 and 19 were obtained. In Table 7, the results of Example 2-2 and Comparative examples 2-1 to 2-3 were shown together.

TABLE 7

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | | | Discharge capacity retention ratio (%) |
|---|---|---|---|---|---|---|
| | Number of anode active material particle layers (layer) | Intensity ratio I (200)/I (111) | Cross-section area of crystallite (μm²) | Extension coefficient of original foil (%) | Young's modulus (MPa) | |
| Example 7-1 | 6 | 0.8 | 50 | 0.7 | $6.53 \times 10^9$ | 73 |
| Example 7-2 | | | | 1 | $5.00 \times 10^9$ | 82 |
| Example 7-3 | | | | 3.2 | $4.01 \times 10^9$ | 82.4 |
| Example 7-4 | | | | 4.9 | $6.32 \times 10^8$ | 83 |
| Example 2-2 | | | | 9 | $5.93 \times 10^7$ | 86 |
| Example 7-5 | | | | 10 | $5.00 \times 10^7$ | 82 |
| Example 7-6 | | | | 10.5 | $3.61 \times 10^6$ | 73 |
| Example 7-7 | | | | 11.5 | $1.61 \times 10^6$ | 72 |
| Comparative example 2-1 | 6 | 0.3 | 50 | 9 | $5.93 \times 10^7$ | 69.5 |

TABLE 7-continued

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | | | Discharge capacity retention ratio (%) |
|---|---|---|---|---|---|---|
| | Number of anode active material particle layers (layer) | Intensity ratio I (200)/I (111) | Cross-section area of crystallite (μm$^2$) | Extension coefficient of original foil (%) | Young's modulus (MPa) | |
| Comparative example 2-2 | | 1.6 | | | | 69.5 |
| Comparative example 2-3 | | 1.8 | | | | 69 |

As shown in Table 7, FIG. 18, and FIG. 19, in Examples 2-2 and 7-1 to 7-7 in which the intensity ratio I (200)/I (111) was in the range from 0.5 to 1.5, the discharge capacity retention ratio was higher than those of Comparative examples 2-1 to 2-3 as well when the extension coefficient and the Young's modulus of the anode current collector 54A were changed. In this case, the discharge capacity retention ratio was changed in an upward convex curve as the extension coefficient was increased and the Young's modulus was decreased. In particular, when the extension coefficient was smaller than 1% and the Young's modulus was larger than $5 \times 10^9$ MPa, or when the extension coefficient was larger than 10% and the Young's modulus was smaller than $5 \times 10^7$ MPa, the discharge capacity retention ratio was extremely lowered. Accordingly, it was confirmed that in the secondary battery of the invention, the cycle characteristics were improved not depending on the extension coefficient and the Young's modulus of the anode current collector. Further, it was confirmed that when the extension coefficient was in the range from 1% to 10% and the Young's modulus was in the range from $5 \times 10^7$ MPa to $5 \times 10^9$ MPa, higher effects were obtained.

Examples 8-1 to 8-6

A procedure was performed in the same manner as that of Example 2-2, except that the oxygen content in the anode active material particle was changed to 2 atomic % (Example 8-1), 10 atomic % (Example 8-2), 20 atomic % (Example 8-3), 30 atomic % (Example 8-4), 40 atomic % (Example 8-5), or 45 atomic % (Example 8-6) instead of 3 atomic %.

Figure 20:
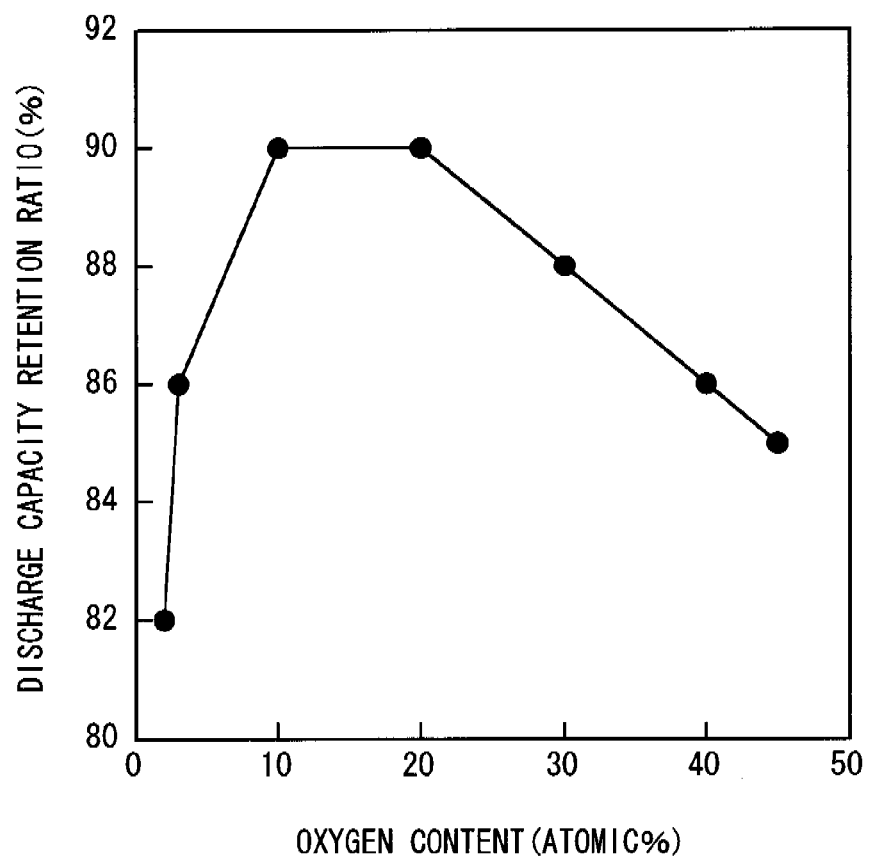
FIG. 20 is a diagram showing a correlation between an oxygen content and a discharge capacity retention ratio.

When the cycle characteristics of the secondary batteries of Examples 8-1 to 8-6 were examined, the results shown in Table 8 and FIG. 20 were obtained. In Table 8, the results of Example 2-2 and Comparative examples 2-1 to 2-3 were shown together.

TABLE 8

Anode active material particle: silicon (electron beam evaporation method)
Thickness of original foil = 18 μm
Ten point height of roughness profile Rz = 3.5 μm

| | Anode active material layer | | Anode current collector | | Discharge capacity retention ratio (%) |
|---|---|---|---|---|---|
| | Number of anode active material particle layers (layer) | Oxygen content (atomic %) | Intensity ratio I (200)/I (111) | Cross-section area of crystallite (μm$^2$) | |
| Example 8-1 | 6 | 2 | 0.8 | 50 | 82 |
| Example 2-2 | | 3 | | | 86 |
| Example 8-2 | | 10 | | | 90 |
| Example 8-3 | | 20 | | | 90 |
| Example 8-4 | | 30 | | | 88 |
| Example 8-5 | | 40 | | | 86 |
| Example 8-6 | | 45 | | | 85 |
| Comparative example 2-1 | 6 | 3 | 0.3 | 50 | 69.5 |
| Comparative example 2-2 | | | 1.6 | | 69.5 |
| Comparative example 2-3 | | | 1.8 | | 69 |

As shown in Table 8 and FIG. 20, in Examples 2-2 and 8-1 to 8-6 in which the intensity ratio I (200)/I (111) was in the range from 0.5 to 1.5, the discharge capacity retention ratio was higher than those of Comparative examples 2-1 to 2-3 as well when the oxygen content was changed. In this case, the discharge capacity retention ratio was changed in an upward convex curve as the oxygen content was increased. In particular, when the oxygen content was smaller than 3 atomic %, the discharge capacity retention ratio was extremely lowered. However, when the oxygen content was larger than 40 atomic %, the silicon content in the anode active material particle was relatively smaller and thus the battery capacity tended to be largely lowered. Accordingly, it was confirmed that in the secondary battery of the invention, the cycle characteristics were improved not depending on the oxygen content in the anode active material. Further, it was confirmed that if the oxygen content was in the range from 3 atomic % to 40 atomic %, the cycle characteristics were improved and the battery capacity was secured.

Examples 9-1 to 9-3

A procedure was performed in the same manner as that of Example 2-2, except that the anode active material particle was formed so that a first oxygen-containing region and a second oxygen-containing region having a higher oxygen content than that of the first oxygen-containing region were alternately layered by depositing silicon while intermittently introducing oxygen gas into the chamber, instead that oxygen was contained in the anode active material particle by depositing silicon while continuously introducing oxygen gas or the like into the chamber. The oxygen content in the second oxygen-containing region was 3 atomic %, and the number thereof was 2 (Example 9-1), 4 (Example 9-2), or 6 (Example 9-3).

Figure 21:
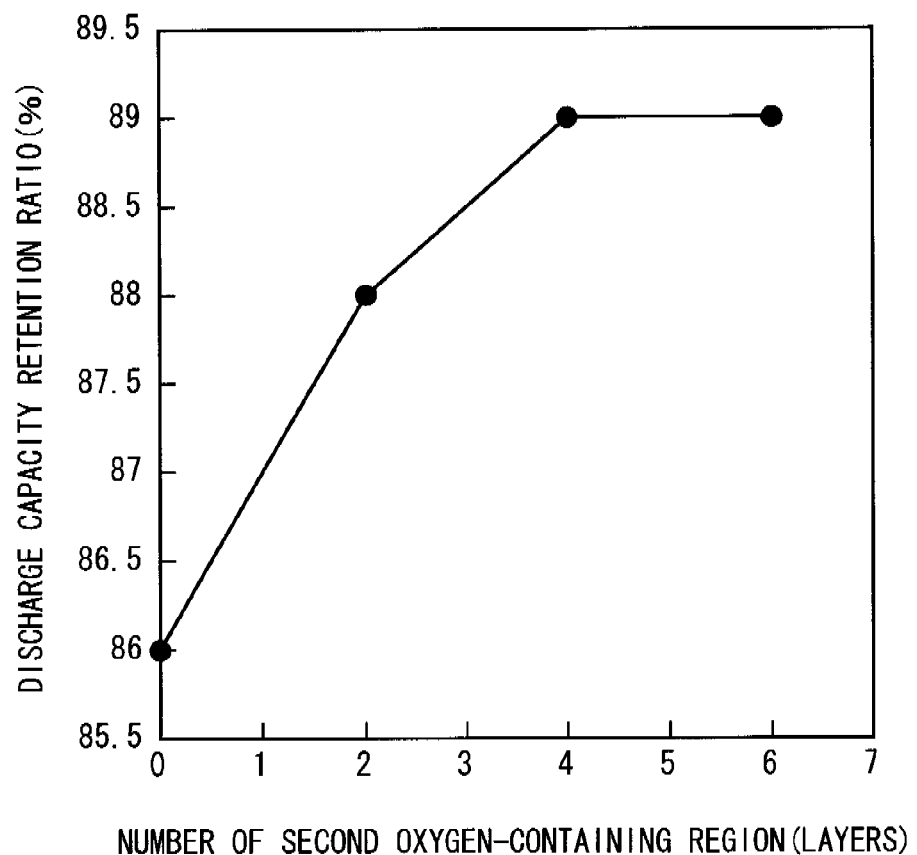
FIG. 21 is a diagram showing a correlation between the number of second oxygen-containing regions and a discharge capacity retention ratio.

When the cycle characteristics of the secondary batteries of Examples 9-1 to 9-3 were examined, the results shown in Table 9 and FIG. 21 were obtained. In Table 9, the results of Example 2-2 and Comparative examples 2-1 to 2-3 are shown together.

as the number of the second oxygen-containing regions was increased, higher effects were obtained.

Example 10-1

A procedure was performed in the same manner as that of Example 2-2, except that the anode active material particle was formed by depositing silicon by using RF sputtering method instead of electron beam evaporation method. At that time, silicon with purity of 99.99% was used as a target, and the deposition rate was 0.5 nm/sec.

Example 10-2

A procedure was performed in the same manner as that of Example 2-2, except that the anode active material particle was formed by depositing silicon by using CVD method instead of electron beam evaporation method. As a raw material and excitation gas, silane ($SiH_4$) and argon (Ar) were used, respectively, and the deposition rate and the substrate temperature were respectively 1.5 nm/sec and 200 deg C.

Comparative Example 10-1

A procedure was performed in the same manner as that of Comparative example 2-1, except that the anode active material particle was formed by using RF sputtering method as in Example 10-1.

TABLE 9

Anode active material particle: silicon (electron beam evaporation method)
Thickness of original foil = 18 μm
Ten point height of roughness profile Rz = 3.5 μm

| | Anode active material layer | | Anode current collector | |
|---|---|---|---|---|
| | Number of anode active material particle layers (layer) | Number of second oxygen-containing regions | Intensity ratio I (200)/I (111) | Cross-section area of crystallite ($\mu m^2$) | Discharge capacity retention ratio (%) |
| Example 2-2 | 6 | — | 0.8 | 50 | 86 |
| Example 9-1 | | 2 | | | 88 |
| Example 9-2 | | 4 | | | 89 |
| Example 9-3 | | 6 | | | 89 |

As shown in Table 9 and FIG. 21, in Examples 9-1 to 9-3 in which the anode active material particle had the first and the second oxygen-containing regions, the discharge capacity retention ratio was higher than that of Example 2-2 in which the anode active material particle did not have the first and the second oxygen-containing regions. In this case, as the number of the second oxygen-containing regions was increased, the discharge capacity retention ratio tended to be higher. Accordingly, it was confirmed that in the secondary battery of the invention, when the anode active material particle had the first and the second oxygen-containing regions, the cycle characteristics were improved. Further, it was confirmed that

Comparative Example 10-2

A procedure was performed in the same manner as that of Comparative example 2-1, except that the anode active material particle was formed by using CVD method as in Example 10-2.

When the cycle characteristics of the secondary batteries of Examples 10-1 and 10-2 and Comparative examples 10-1 and 10-2 were examined, the results shown in Table 10 were obtained. In Table 10, the results of Example 2-2 and Comparative examples 2-2 are shown together.

TABLE 10

Anode active material particle: silicon
Thickness of original foil = 18 μm
Ten point height of roughness profile Rz = 3.5 μm
Oxygen content in the anode active material particle = 3 atomic %

|  | Anode active material layer | | Anode current collector | | Discharge capacity retention ratio (%) |
|---|---|---|---|---|---|
|  | Number of anode active material particle layers (layer) | Forming method | Intensity ratio I (200)/I (111) | Cross-section area of crystallite (μm²) |  |
| Example 2-2 | 6 | Electron beam evaporation method | 0.8 | 50 | 86 |
| Example 10-1 |  | Sputtering method |  |  | 84 |
| Example 10-2 |  | CVD method |  |  | 83 |
| Comparative example 2-1 | 6 | Electron beam evaporation method | 0.3 | 50 | 69.5 |
| Comparative example 10-1 |  | Sputtering method |  |  | 65 |
| Comparative example 10-2 |  | CVD method |  |  | 64 |

As shown in Table 10, in Examples 10-1 and 10-2 in which sputtering method or CVD method was used as a method of forming the anode active material particle, the discharge capacity retention ratio equal to that of Example 2-2 using electron beam evaporation method was obtained. In this case, when each method of forming the anode active material particle was compared to each other, the discharge capacity retention ratio tended to be increased in the order of CVD method, sputtering method, and electron beam evaporation method. It is needless to say that in Examples 2-2, 10-1, and 10-2 in which the intensity ratio I (200)/I (111) was in the range from 0.5 to 1.5, the discharge capacity retention ratio was higher than those of Comparative examples 2-1, 10-1, and 10-2 in which the intensity ratio I (200)/I (111) was out of the range. Accordingly, it was confirmed that in the secondary battery of the invention, the cycle characteristics were improved not depending on the method of forming the anode active material particle. Further, it was confirmed that the effect was improved in the order of CVD method, sputtering method, and electron beam evaporation method as the method of forming the anode active material particle.

Example 11-1

A procedure was performed in the same manner as that of Example 2-2, except that the square secondary battery shown in FIG. 4 and FIG. 5 was fabricated instead of the laminated film secondary battery by the following procedure.

First, the cathode 21 and the anode 22 were formed. After that, the cathode lead 24 made of aluminum and the anode lead 25 made of nickel were respectively welded to the cathode current collector 21A and the anode current collector 22A. Subsequently, the cathode 21, the separator 23, and the anode 22 were layered in this order, and spirally wound in the longitudinal direction, and formed in the flat shape. Thereby, the battery element 20 was formed. Subsequently, the battery element 20 was contained inside the battery can 11 made of aluminum. After that, the insulating plate 12 was arranged on the battery element 20. Subsequently, the cathode lead 24 and the anode lead 25 were respectively welded to the cathode pin 15 and the battery can 11. After that, the battery cover 13 was fixed to the open end of the battery can 11 by laser welding. Finally, the electrolytic solution was injected into the battery can 11 through the injection hole 19. After that, the injection hole 19 was sealed by the sealing member 19A, and thereby the square battery was fabricated.

Example 11-2

A procedure was performed in the same manner as that of Example 11-1, except that the battery can 11 made of iron was used instead of the battery can 11 made of aluminum.

When the cycle characteristics of the secondary batteries of Examples 11-1 and 11-2 were examined, the results shown in Table 11 were obtained. Table 11 shows the result of Example 2-2 together.

TABLE 11

Anode active material particle: silicon (electron beam evaporation method)
Thickness of original foil = 18 μm
Ten point height of roughness profile Rz = 3.5 μm
Oxygen content in the anode active material particle = 3 atomic %

|  | Anode active material layer | Anode current collector | | | Discharge capacity retention ratio (%) |
|---|---|---|---|---|---|
|  | Number of anode active material particle layers (layer) | Intensity ratio I (200)/I (111) | Cross-section area of crystallite (μm²) | Battery structure |  |
| Example 2-2 | 6 | 0.8 | 50 | Laminated film | 86 |
| Example 11-1 |  |  |  | Square (aluminum) | 89 |

TABLE 11-continued

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | | |
|---|---|---|---|---|---|
| | Number of anode active material particle layers (layer) | Intensity ratio I (200)/I (111) | Cross-section area of crystallite (μm$^2$) | Battery structure | Discharge capacity retention ratio (%) |
| Example 11-2 | | | | Square (iron) | 92 |

As shown in Table 11, in Examples 11-1 and 11-2 in which the battery structure was square, the discharge capacity retention ratio was higher than that of Example 2-2 in which the battery structure was the laminated film type. That is, when each material of the battery can 11 was compared to each other, the discharge capacity retention ratio tended to be higher in the case that iron was used than in the case that aluminum was used. Accordingly, it was confirmed that in the secondary battery of the invention, the cycle characteristics were improved not depending the battery structure. Further, it was confirmed that when the battery structure was square, higher effects were obtained in the case that the battery can 11 made of iron was used than in the case that the battery can 11 made aluminum was used. Though no specific examples for a cylindrical secondary battery in which the package member is made of a metal material have been herein given, it is evident that similar effects is obtained in such a cylindrical secondary battery since the cycle characteristics were improved in the square secondary battery including the package member made of the metal than in the laminated film secondary battery including the film package member.

Examples 12-1

A procedure was performed in the same manner as that of Example 2-2, except that 4-fluoro-1,3-dioxolane-2-one (FEC) as fluorinated ester carbonate (monofluoroethylene carbonate) was used instead of EC as a solvent.

Example 12-2

A procedure was performed in the same manner as that of Example 2-2, except that 4,5-difluoro-1,3-dioxolane-2-one (DFEC) as fluorinated ester carbonate (difluoroethylene carbonate) was added as a solvent, and the composition of the mixed solvent (EC:DFEC:DEC) was 25:5:70 at a weight ratio.

Examples 12-3 and 12-4

A procedure was performed in the same manner as that of Example 12-1, except that vinylene carbonate (VC: Example 12-3) or vinylethylene carbonate (VEC: Example 12-4) that was a cyclic carbonate having an unsaturated bond was added as a solvent to the electrolytic solution. The contents of VC or VEC in the electrolytic solution was 10 wt %.

Example 12-5

A procedure was performed in the same manner as that of Example 12-1, except that 1,3-propenesultone (PRS) as sultone was added as a solvent to the electrolytic solution. The concentration of PRS in the electrolytic solution was 1 wt %.

Example 12-6

A procedure was performed in the same manner as that of Example 12-1, except that lithium tetrafluoroborate (LiBF$_4$) that was a compound having boron and fluorine was added as an electrolyte salt to the electrolytic solution. The concentration of LiBF$_4$ in the electrolytic solution was 0.1 mol/kg.

When the cycle characteristics were examined for the secondary batteries of Examples 12-1 to 12-6, the results shown in Table 12 were obtained. Table 12 shows the result of Example 2-2 together.

For the secondary batteries of Examples 2-2 and 12-5, not only the cycle characteristics but also the swollenness characteristics were examined. When the swollenness characteristics were examined, the swollenness ratio was obtained by charging the secondary battery by the following procedure. First, to stabilize the battery state, after charge and discharge were performed 1 cycle in the atmosphere at 23 deg C., the thickness before charge at the second cycle was measured. Subsequently, charge was performed again in the same atmosphere. After that, the thickness after charge at the second cycle was measured. Finally, the swollenness ratio (%)= [(thickness after charge−thickness before charge)/thickness before charge]×100 was calculated. The charge condition was similar to the case examining the cycle characteristics.

TABLE 12

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | Anode current collector | | Electrolytic solution | | | | | Discharge capacity | |
|---|---|---|---|---|---|---|---|---|---|---|
| | Number of anode active material particle layers (layer) | Intensity ratio I(200)/I(111) | Cross-section area of crystallite (μm²) | Solvent (wt %) | | | | | retention ratio (%) | Swollenness ratio (%) |
| | | | | EC | FEC | DFEC | DEC | Others | | |
| Example 2-2 | 6 | 0.8 | 50 | 50 | — | — | 50 | — | 86 | 3.01 |
| Example 12-1 | | | | — | 50 | — | 50 | | 90 | — |
| Example 12-2 | | | | 25 | — | 5 | 70 | | 91 | — |
| Example 12-3 | | | | — | 50 | — | 50 | VC | 92 | — |
| Example 12-4 | | | | | | | | VEC | 93 | — |
| Example 12-5 | | | | | | | | PRS | 92 | 0.30 |
| Example 12-6 | | | | | | | | LiBF$_4$ | 91 | — |

As shown in Table 12, in Examples 12-1 to 12-6 in which the fluorinated ester carbonate (FEC or DFEC) was added to a solvent, or the cyclic ester carbonate or the like having an unsaturated bond as a solvent o (VC, VEC, PRS, or LiBF$_4$) was added to the electrolytic solution, the discharge capacity retention ratio was higher than that of Example 2-2 in which the foregoing was not added. In this case, the discharge capacity retention ratio of Example 12-2 in which the solvent contained DFEC as difluoroethylene carbonate tended to be higher than that of Example 12-1 in which the solvent contained FEC as monofluoroethylene carbonate. Further, the discharge capacity retention ratio of Examples 12-3 to 12-6 containing VC or the like tended to be higher than that of Example 12-1 not containing VC or the like. More specifically, the discharge capacity retention ratio of Examples 12-3 and 12-4 in which the solvent contained VC or VEC was higher than that of Examples 12-5 and 12-6 in which the solvent contained PRS or LiBF$_4$. Further, the discharge capacity retention ratio of Example 12-4 in which the solvent contained VEC was higher than that of Example 12-3 in which the solvent contained VC. Accordingly, it was confirmed that in the secondary battery of the invention, the cycle characteristics were improved not depending on the composition of the solvent and the electrolytic solution. Further, it was confirmed that when the solvent contained the fluorinated ester carbonate, the cyclic ester carbonate having an unsaturated bond, sultone, or the electrolyte salt containing boron and fluorine, higher effects were obtained. In particular, to obtain higher effects, difluoroethylene carbonate was more preferable than monofluoroethylene carbonate as the fluorinated ester carbonate, and vinylethylene carbonate was more preferable than vinylene carbonate as the cyclic ester carbonate having an unsaturated bond.

Further, in Example 12-5 in which the solvent contained PRS, the swollenness ratio was largely lowered than that of Example 2-2 in which the solvent did not contain PRS. Thereby, it was confirmed that in the secondary battery of the invention, when the solvent contained sultone, the swollenness characteristics were improved.

Example 13-1

A procedure was performed in the same manner as that of Example 2-2, except that a metal was formed after the anode active material particle was formed. The metal was formed by depositing cobalt by electrolytic plating method on the both faces of the anode current collector 54A formed with the anode active material particle, and thereby the anode active material layer 54B was formed to contain the metal together with the anode active material particle. As a plating solution, a cobalt plating solution (Nippon Kojundo Kagaku Co., Ltd. make) was used. The current density was in the range from 2 A/dm² to 5 A/dm², and the plating rate was 10 nm/sec. Further, the ratio (molar ratio) M2/M1 between the number of moles M1 per unit area of the anode active material particle and the number of moles M2 per unit area of the metal was 1/15.

Examples 13-2 to 13-7

A procedure was performed in the same manner as that of Example 13-1, except that the molar ratio M2/M1 was 1/10 (Example 13-2), 1/5 (Example 13-3), 1/2 (Example 13-4), 1/1 (Example 13-5), 2/1 (Example 13-6), or 3/1 (Example 13-7) instead of 1/15.

Examples 13-8 to 13-11

A procedure was performed in the same manner as that of Example 13-4, except that an iron plating solution (Example 13-8), a nickel plating solution (Example 13-9), a zinc plating solution (Example 13-10), or a copper plating solution (Example 13-11) was used instead of the cobalt plating solution as a plating solution. The current density was in the range from 2 A/dm² to 5 A/dm² in the case of using the iron plating solution, in the range from 2 A/dm² to 10 A/dm² in the case of using the nickel plating solution, in the range from 1 A/dm² to 3 A/dm² in the case of using the zinc plating solution, and in the range from 2 A/dm² to 8 A/dm² in the case of using the copper plating solution. All the foregoing plating solutions were made by Nippon Kojundo Kagaku Co., Ltd.

Figure 22:
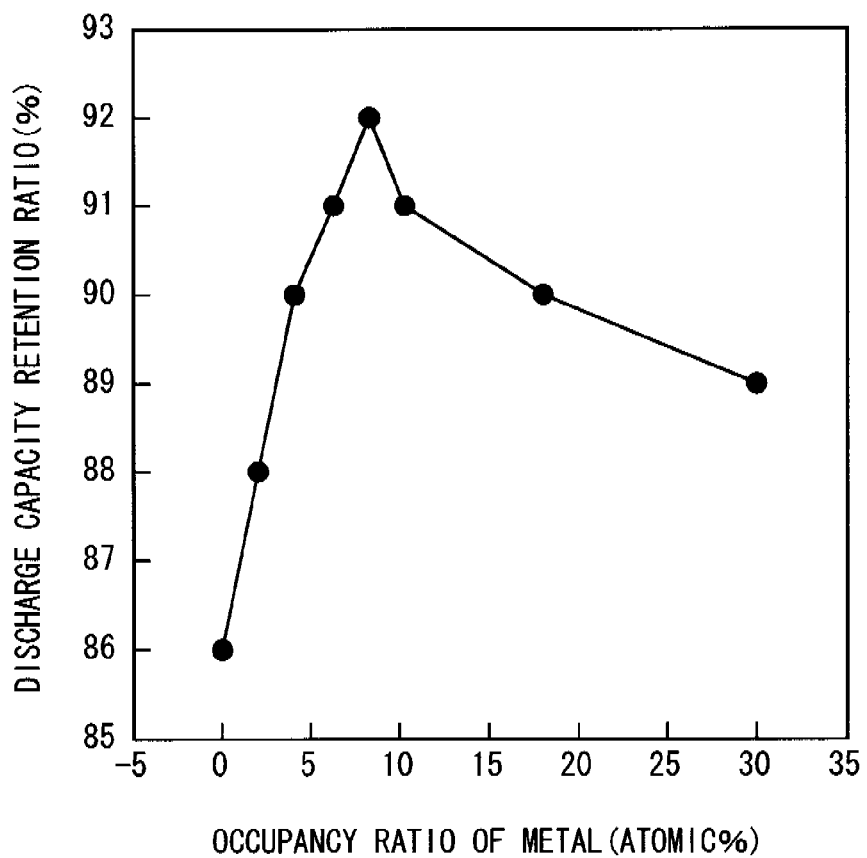
FIG. 22 is a diagram showing a correlation between a metal occupancy ratio and a discharge capacity retention ratio.

When the cycle characteristics of the secondary batteries of Examples 13-1 to 13-11 were examined, the results shown in Table 13 and FIG. 22 were obtained. Table 13 shows the result of Example 2-2 together.

Figure 24:
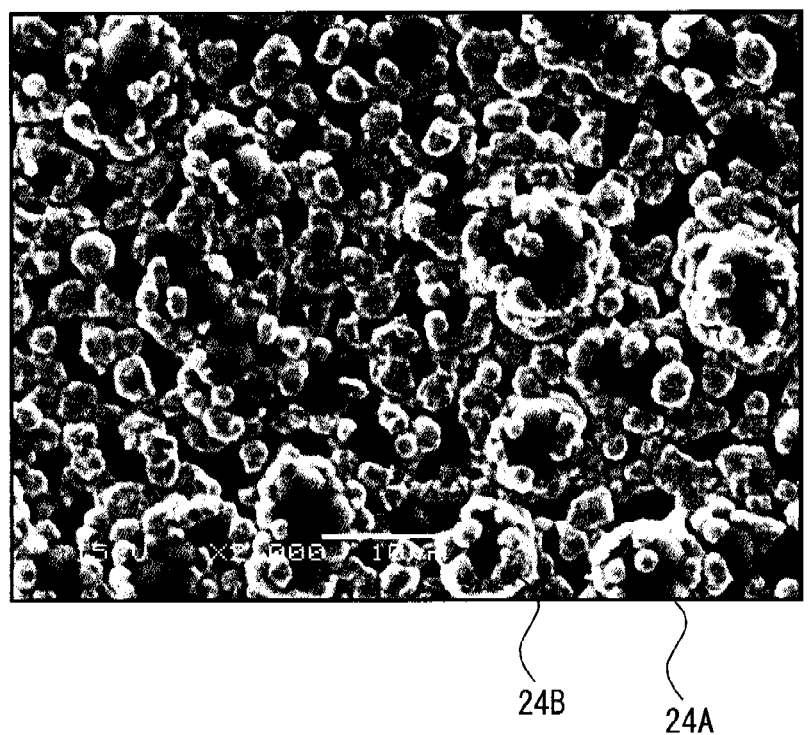
FIG. 24 is an SEM photograph showing a surface structure of the anode (Example 13-4)

For the secondary batteries of Examples 13-1 to 13-11, to examine not only the cycle characteristics but also the relation between a metal amount and the cycle characteristics, the ratio of the number of atoms occupied by the metal (occupancy ratio of the metal) on the surface of the anode 54 was also examined. To examine the occupancy ratio of the metal, the surface of the anode 54 was provided with element analysis with the use of an EDX, and thereby the metal existence ratio on the surface was measured.

the metal intruded into the foregoing gap is also evident from FIG. 24. In FIG. 24, the high-contrast part shown by 24A is the anode active material particle, and the low-contrast part shown by 24B is the metal. Thereby, it was confirmed that in

TABLE 13

Anode active material particle: silicon (electron beam evaporation method)
Thickness of original foil = 18 μm
Ten point height of roughness profile Rz = 3.5 μm
Oxygen content in the anode active material particle = 3 atomic %

| | Anode active material layer | | | | Anode current collector | | |
|---|---|---|---|---|---|---|---|
| | Number of anode active material particle layers (layer) | Metal type | Molar ratio M2/M1 | Occupancy ratio of metal (atomic %) | Intensity ratio I (200)/I (111) | Cross-section area of crystallite (μm$^2$) | Discharge capacity retention ratio (%) |
| Example 2-2 | 6 | — | — | — | 0.8 | 50 | 86 |
| Example 13-1 | | Co | 1/15 | 2 | | | 88 |
| Example 13-2 | | | 1/10 | 4.1 | | | 90 |
| Example 13-3 | | | 1/5 | 6.3 | | | 91 |
| Example 13-4 | | | 1/2 | 8.3 | | | 92 |
| Example 13-5 | | | 1/1 | 10.3 | | | 91 |
| Example 13-6 | | | 2/1 | 18 | | | 90 |
| Example 13-7 | | | 3/1 | 30 | | | 89 |
| Example 13-8 | | Fe | 1/2 | 11.2 | | | 91 |
| Example 13-9 | | Ni | | 9.5 | | | 90 |
| Example 13-10 | | Zn | | 8.5 | | | 90 |
| Example 13-11 | | Cu | | 8.9 | | | 90 |

As shown in Table 13 and FIG. 22, in Examples 13-1 to 13-11 in which the metal was formed, when the molar ratio M2/M1 was in the range from 1/15 to 3/1 and the occupancy ratio of the metal was in the range from 2 atomic % to 30 atomic %, the discharge capacity retention ratio thereof was higher than that of Example 2-2 in which the metal was not formed. In this case, Examples 13-4, 13-8 to 13-11 having the different metal types were compared to each other, the discharge capacity retention ratio was higher in the case of using iron than in the case of using copper, zinc, and nickel as the metal; and still higher in the case of using cobalt. Thereby, it was confirmed that in the secondary battery of the invention, when the metal having the metal element not reacting with the electrode reactant was formed after the anode active material particle was formed, the cycle characteristics were improved. It was also confirmed that in this case, when cobalt was used as the metal, higher effects were obtained.

As a representative of Examples 2-2 and 13-1 to 13-11 described above, when cross sections of the anodes 54 in the secondary batteries of Examples 2-2 and 13-4 were observed, the results shown in FIG. 23A to FIG. 25B were obtained.

Figure 23A:
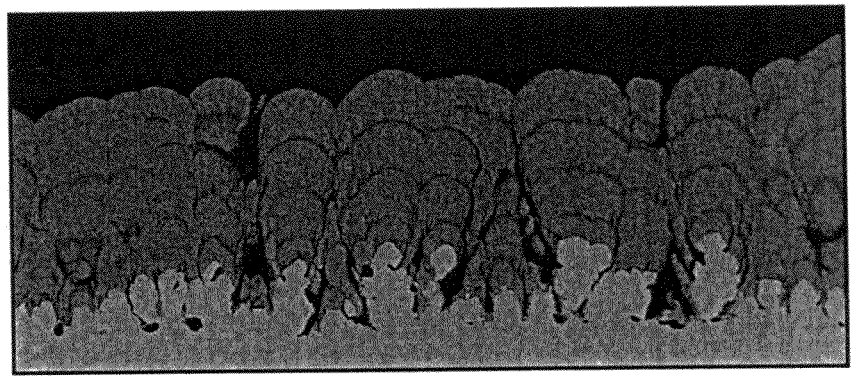
FIGS. 23A and 23B are SEM photographs showing cross sectional structures of anodes (Examples 2-2 and 13-4)
Figure 23B:
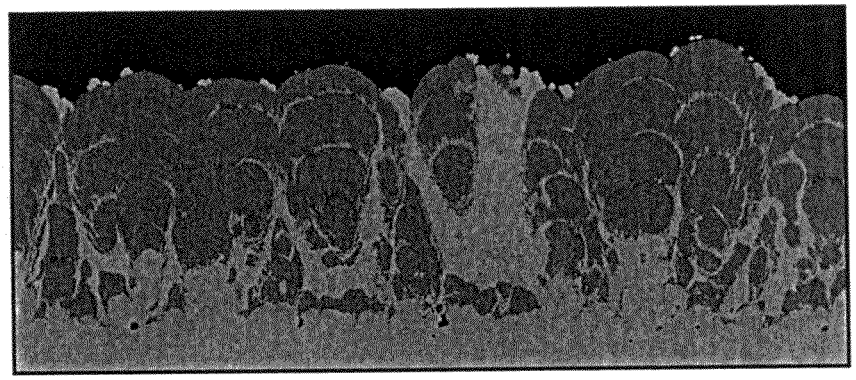

FIGS. 23A and 23B are SEM photographs showing the cross sectional structures of the anode 54 before a cycle test. FIG. 23A and FIG. 23B respectively show observation results of Examples 2-2 and 13-4. FIG. 24 is an SEM photograph showing the surface structure of the anode 54 of Example 13-4 before the cycle test. As shown in FIGS. 23A and 23B, in both Examples 2-2 and 13-4, in the anode active material layer 54B formed on the roughened surface of the anode current collector 54A, a state that the anode active material particle was grown on the surface with six-layer structure was observed. However, in Example 2-2, as shown in FIG. 23A, a gap was generated between each anode active material particle and in the anode active material particle. Meanwhile, in Example 13-4, as shown in FIG. 23B, the metal intrudes into the foregoing gap, and each anode active material particle was bound to each other through the metal. In particular, in Example 13-4, part of the exposed face of the anode active material particle was coated with the metal. Such a state that the secondary battery of the invention, the binding characteristics of the anode active material layer 54B were improved by the metal.

Figure 25A:
FIGS. 25A and 25B are EDX element distribution analysis results of a cross section of the anode (Example 13-4).
Figure 25B:
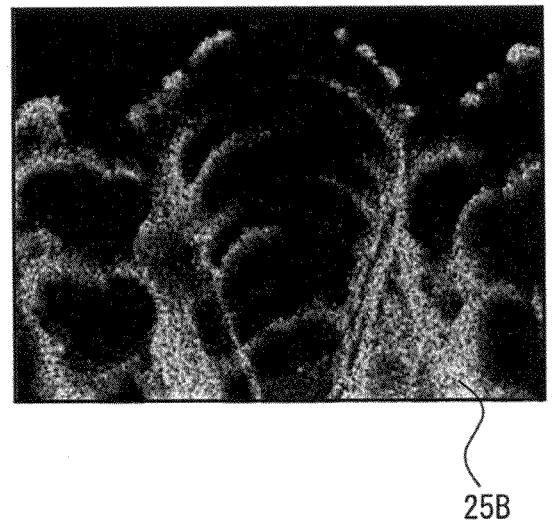

FIGS. 25A and 25B are results obtained by performing element distribution analysis by an EDX (so-called mapping of element distribution) for the cross section of the anode 54 of Example 13-4 shown in FIG. 23B. In FIG. 25A, the low-contrast part shown by 25A is the silicon distribution range. In FIG. 25B, the low-contrast part shown by 25B is the cobalt distribution range. As shown in FIGS. 25A and 25B, the range where silicon as the anode active material particle did not exist (the portion surrounded by 25A in FIG. 25A) corresponded with the range where cobalt as the metal existed (the portion surrounded by 25B in FIG. 25B). Such a range was the gap between adjacent anode active material particles and the gap in the anode active material particle. In particular, in Example 13-4, the metal was dotted on the exposed face of the anode active material particle as well. Accordingly, it was confirmed that in the secondary battery of the invention, the metal intruded into the gap between the anode active material particles and the gap in the anode active material particle, and part of the exposed face of the anode active material particle was coated with the metal.

The invention has been described with reference to the embodiment and the examples. However, the invention is not limited to the aspects described in the foregoing embodiment and the foregoing examples, and various modifications may be made. For example, the current collector and the anode of the invention are not limitedly applied to the battery, but may be applied to other electrochemical device other than the battery. For example, the current collector and the anode of the invention may be applied to a capacitor or the like.

Further, in the foregoing embodiment and the foregoing examples, the descriptions have been given of the lithium ion secondary battery in which the anode capacity is expressed based on insertion and extraction of lithium as a battery type. However, the battery of the invention is not limited thereto. The invention is similarly applicable to a secondary battery in which the anode capacity includes the capacity based on insertion and extraction of lithium and the capacity based on precipitation and dissolution of lithium, and the anode capacity is expressed as the sum of these capacities, by setting the charge capacity of the anode material capable of inserting and extracting lithium to a smaller value than that of the charge capacity of the cathode.

Further, in the foregoing embodiment and the foregoing examples, the description has been given with the specific examples of the square, cylindrical, or laminated film secondary battery as a battery structure, and with the specific example of the battery in which the battery element has the spirally wound structure. However, the invention is similarly applicable to a battery having other structure such as a coin type battery and a button type battery, or a battery in which the battery element has other structure such as a lamination structure. The battery of the invention is similarly applicable to other type of battery such as a primary battery in addition to the secondary battery.

Further, in the foregoing embodiment and the foregoing examples, the description has been given of the case using lithium as an electrode reactant. However, as an electrode reactant, other Group 1A element such as sodium (Na) and potassium (K), a Group 2A element such as magnesium (Mg) and calcium (Ca), or other light metal such as aluminum may be used. In this case, the anode material described in the foregoing embodiment may be used as an anode active material as well.

Further, in the foregoing embodiment and the foregoing examples, regarding the intensity ratio I (200)/I (111) in the current collector of the invention, the numerical value range thereof derived from the results of the examples has been described as the appropriate range. However, such a description does not totally eliminate the possibility that the intensity ratio may be out of the foregoing range. That is, the foregoing appropriate range is the range particularly preferable for obtaining the effects of the invention. Therefore, as long as effects of the invention may be obtained, the intensity ratio may be out of the foregoing range in some degrees. The same is applied to the cross section of the copper crystallite, the ten point height of roughness profile Rz of the current collector, the extension coefficient, the Young's modulus, the thickness of the original foil and the like, in addition to the foregoing intensity ratio.

It should be understood by those skilled in the art that various modifications, combinations, sub-combinations and alternations may occur depending on design requirements and other factors insofar as they are within the scope of the appended claims or the equivalents thereof.

What is claimed is:

1. A current collector comprising a plurality of copper crystallites, wherein:
a ratio, I (200)/I (111), between intensity I (200) of a peak originated in a (200) crystal plane of copper obtained by X-ray diffraction and intensity I (111) of a peak originated in a (111) crystal plane thereof is in the range from 0.5 to 1.5,
a cross-section area of each copper crystallite is 100 μm$^2$ or less, and
the current collector has an extension coefficient in the range from 1% to 10%, and a Young's modulus in the range from $5 \times 10^7$ MPa to $5 \times 10^9$ MPa.

2. The current collector according to claim 1, wherein ten point height of roughness profile Rz of a surface of the current collector is in the range from 1.5 μm to 5.5 μm.

3. The current collector according to claim 1 wherein a thickness of the layer is in the range from 10 μm to 25 μm.

4. An anode comprising:
a current collector, the current collector comprising (a) a layer, (b) a plurality of fine particles on the layer, and (c) a plated film over the fine particles; and
an active material layer on the current collector,
wherein,
the layer comprises a plurality of copper crystallites,
a ratio I (200)/I (111) between intensity I (200) of a peak originated in a (200) crystal plane of copper obtained by X-ray diffraction and intensity I (111) of a peak originated in a (111) crystal plane thereof is in the range from 0.5 to 1.5,
a cross-section area of each copper crystallite is 100 μm$^2$ or less, and
the current collector has an extension coefficient in the range from 1% to 10%, and a Young's modulus in the range from $5 \times 10^7$ MPa to $5 \times 10^9$ MPa.

5. The anode according to claim 4, wherein ten point height of roughness profile Rz of a surface of the current collector is in the range from 1.5 μm to 5.5 μm.

6. The anode according to claim 4, wherein a thickness of the layer is in the range from 10 μm to 25 μm.

7. The anode according to claim 4, wherein the current collector and the active material layer are alloyed in at least part of an interface therebetween.

8. The anode according to claim 4, wherein the active material layer includes a plurality of active material particles containing silicon (Si).

9. The anode according to claim 8, wherein the active material particles further contain oxygen (O), and a content of the oxygen in the active material particles is in the range from 3 atomic % to 40 atomic %.

10. The anode according to claim 8, wherein the active material particles further have an oxygen-containing region containing oxygen in a thickness direction, and a content of the oxygen in the oxygen-containing region is higher than a content of oxygen in other regions.

11. The anode according to claim 8, wherein the active material layer includes a metal containing a metal element not being alloyed with an electrode reactant in a gap between the active material particles.

12. The anode according to claim 11, wherein the active material layer includes the metal in at least part of an exposed face of the active material particles.

13. The anode according to claim 11, wherein the active material particles have a multilayer structure in the particles, and the active material layer includes the metal in a gap in the active material particles.

14. The anode according to claim 11, wherein the metal element is at least one selected from the group consisting of iron (Fe), cobalt (Co), nickel (Ni), zinc (Zn), and copper (Cu).

15. The anode according to claim 11, wherein a ratio M2/M1 between the number of moles M1 per unit area of the active material particles and the number of moles M2 per unit area of the metal is in the range from 1/15 to 3/1.

16. The anode according to claim 11, wherein a ratio of the number of atoms occupied by the metal on a surface of the active material layer is in the range from 2 atomic % to 30 atomic %.

17. The anode according to claim 8, wherein the active material particles are formed by vapor-phase deposition method.

18. The anode according to claim 11, wherein the metal is formed by liquid-phase deposition method.

19. A battery comprising:
a cathode;
an anode; and
an electrolytic solution, wherein,
the anode has a current collector and an active material layer provided thereon, and
the current collector comprises (a) a layer, (b) a plurality of fine particles on the layer, and (c) a plated film over the fine particles,
the layer comprises a plurality of copper crystallites,
a ratio I (200)/I (111) between intensity I (200) of a peak originated in a (200) crystal plane of copper obtained by X-ray diffraction and intensity I (111) of a peak originated in a (111) crystal plane thereof is in the range from 0.5 to 1.5,
a cross-section of each copper crystallite is 100 $\mu m^2$ or less, and
the current collector has an extension coefficient in the range from 1% to 10%, and a Young's modulus in the range from $5\times10^7$ MPa to $5\times10^9$ MPa.

20. The battery according to claim 19, wherein ten point height of roughness profile Rz of a surface of the current collector is in the range from 1.5 μm to 5.5 μm.

21. The battery according to claim 19, wherein a thickness of the layer is in the range from 10 μm to 25 μm.

22. The battery according to claim 19, wherein the current collector and the active material layer are alloyed in at least part of an interface therebetween.

23. The battery according to claim 19, wherein the active material layer contains a plurality of active material particles containing silicon.

24. The battery according to claim 23, wherein the active material particles further contain oxygen, and a content of the oxygen in the active material particles is in the range from 3 atomic % to 40 atomic %.

25. The battery according to claim 23, wherein the active material particles further have an oxygen-containing region containing oxygen in a thickness direction, and a content of the oxygen in the oxygen-containing region is higher than a content of oxygen in other regions.

26. The battery according to claim 23, wherein the active material layer includes a metal containing a metal element not being alloyed with an electrode reactant in a gap between the active material particles.

27. The battery according to claim 26, wherein the active material layer includes the metal in at least part of an exposed face of the active material particles.

28. The battery according to claim 26, wherein the active material particles have a multilayer structure in the particles, and the active material layer includes the metal in a gap in the active material particles.

29. The battery according to claim 26, wherein the metal element is at least one selected from the group consisting of iron, cobalt, nickel, zinc, and copper.

30. The battery according to claim 26, wherein a ratio M2/M1 between the number of moles M1 per unit area of the active material particles and the number of moles M2 per unit area of the metal is in the range from 1/15 to 3/1.

31. The battery according to claim 26, wherein a ratio of the number of atoms occupied by the metal on a surface of the active material layer is in the range from 2 atomic % to 30 atomic %.

32. The battery according to claim 23, wherein the active material particles are formed by vapor-phase deposition method.

33. The battery according to claim 26, wherein the metal is formed by liquid-phase deposition method.

34. The battery according to claim 19, wherein the electrolytic solution contains a solvent containing sultone.

35. The battery according to claim 34, wherein the sultone is 1,3-propanesultone.

36. The battery according to claim 19, wherein the electrolytic solution contains a solvent containing a cycle ester carbonate having an unsaturated bond.

37. The battery according to claim 36, wherein the cycle ester carbonate having an unsaturated bond is vinylene carbonate or vinylethylene carbonate.

38. The battery according to claim 19, wherein the electrolytic solution includes a solvent containing fluorinated ester carbonate.

39. The battery according to claim 38, wherein the fluorinated ester carbonate is difluoroethylene carbonate.

40. The battery according to claim 19, wherein the electrolytic solution includes an electrolyte salt containing boron (B) and fluorine (F).

41. The battery according to claim 40, wherein the electrolyte salt is lithium tetrafluoroborate ($LiBF_4$).

42. The battery according to claim 19, wherein the cathode, the anode, and the electrolytic solution are contained in a cylindrical or square package member.

43. The battery according to claim 42, wherein the package member contains iron or an iron alloy.

44. The current collector according to claim 19, further comprising a plurality of fine particles formed on each side of the copper crystallites.

45. The current collector according to claim 44, further comprising a plated film extending over the fine particles on each side of the copper crystallites to provide a pair of faces operable to receive an active material thereon.

* * * * *